Figure 1:
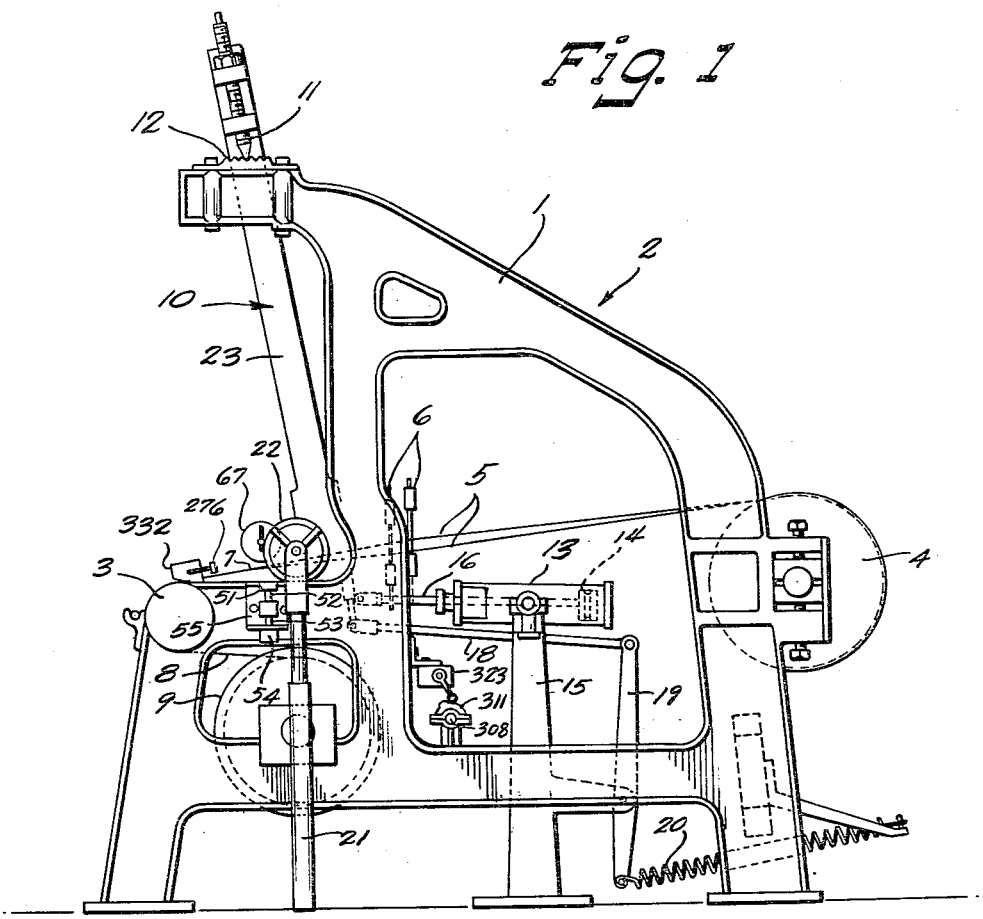

Dec. 18, 1956  H. C. FRENTZEL  2,774,388
SHUTTLE CONTROL
Filed Sept. 3, 1953  12 Sheets-Sheet 1

INVENTOR.
Herman C. Frentzel
BY
Arthur H. Seidel
Attorney

Dec. 18, 1956  H. C. FRENTZEL  2,774,388
SHUTTLE CONTROL
Filed Sept. 3, 1953  12 Sheets-Sheet 3
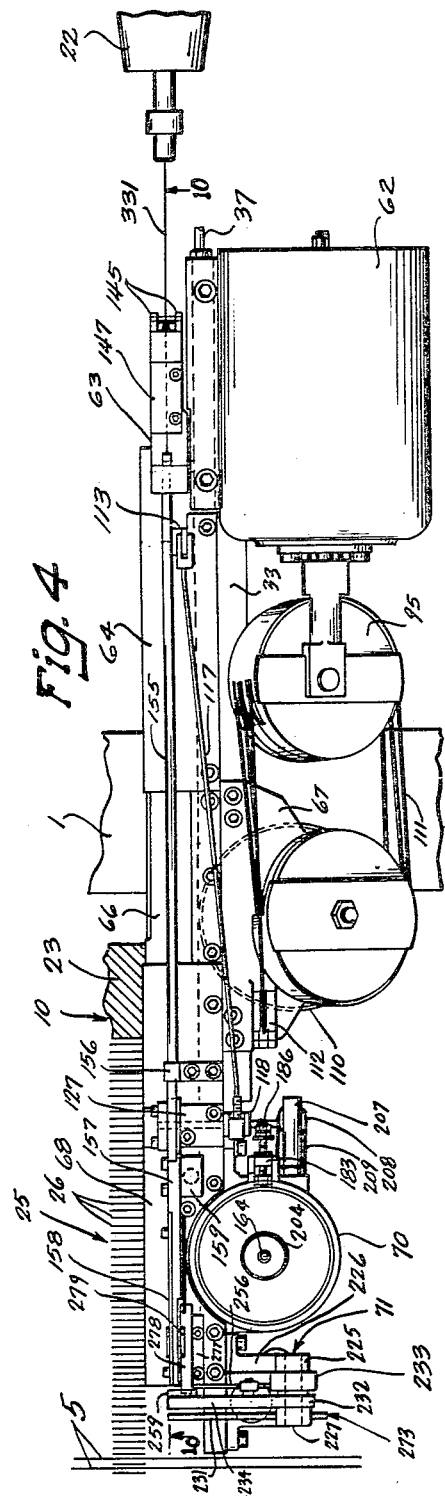
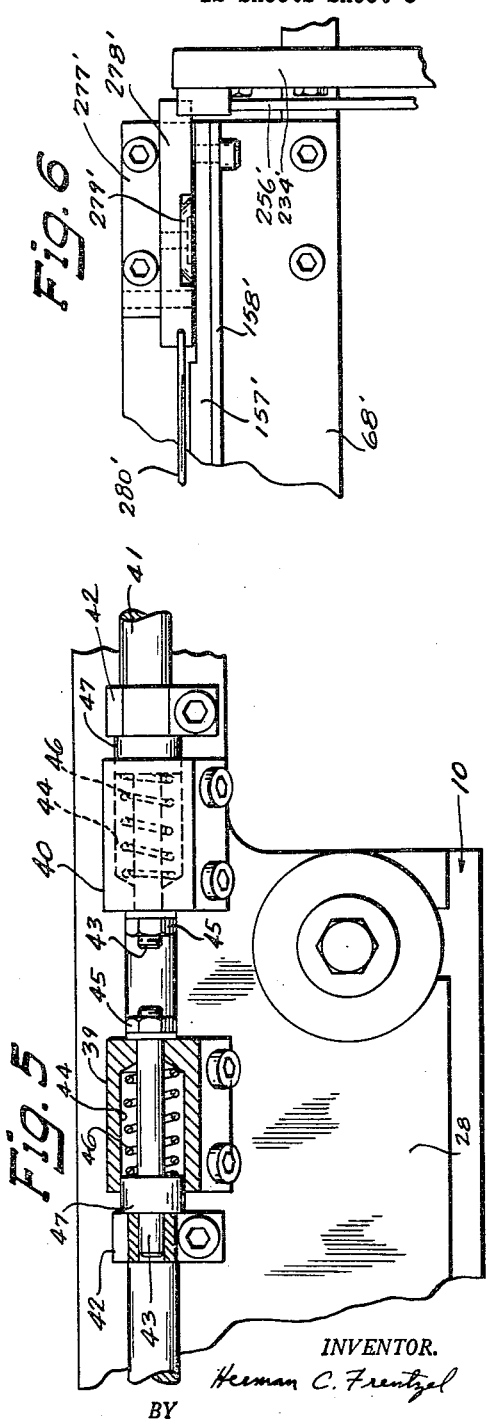
INVENTOR.
Herman C. Frentzel
BY Arthur H. Seidel
Attorney Dec. 18, 1956  H. C. FRENTZEL  2,774,388
SHUTTLE CONTROL
Filed Sept. 3, 1953  12 Sheets-Sheet 4
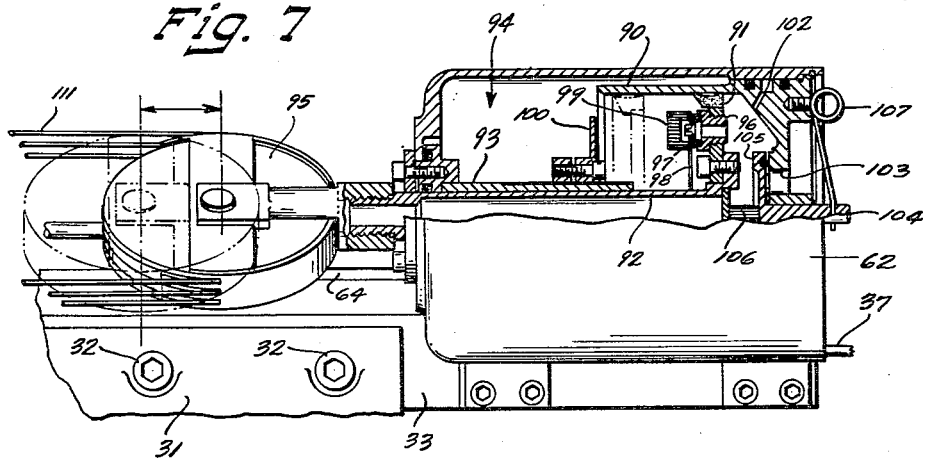
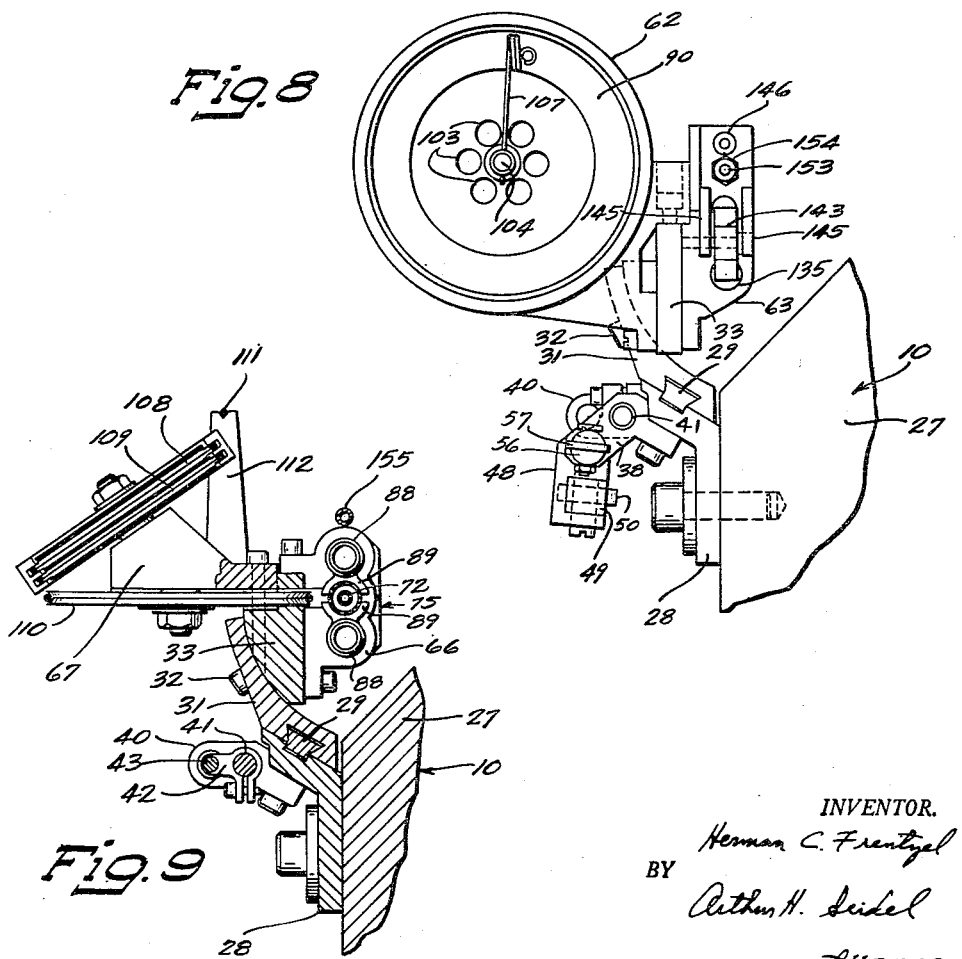
INVENTOR.
Herman C. Frentzel
BY
Arthur H. Seidel
Attorney.

Dec. 18, 1956 H. C. FRENTZEL 2,774,388
SHUTTLE CONTROL
Filed Sept. 3, 1953 12 Sheets-Sheet 5

INVENTOR.
Herman C. Frentzel
BY
Arthur H. Seidel
Attorney

INVENTOR.
Herman C. Frentzel
BY
Arthur H. Seidel
Attorney

Dec. 18, 1956    H. C. FRENTZEL    2,774,388
SHUTTLE CONTROL
Filed Sept. 3, 1953    12 Sheets-Sheet 7

INVENTOR.
Herman C. Frentzel
BY Arthur H. Seidel
Attorney

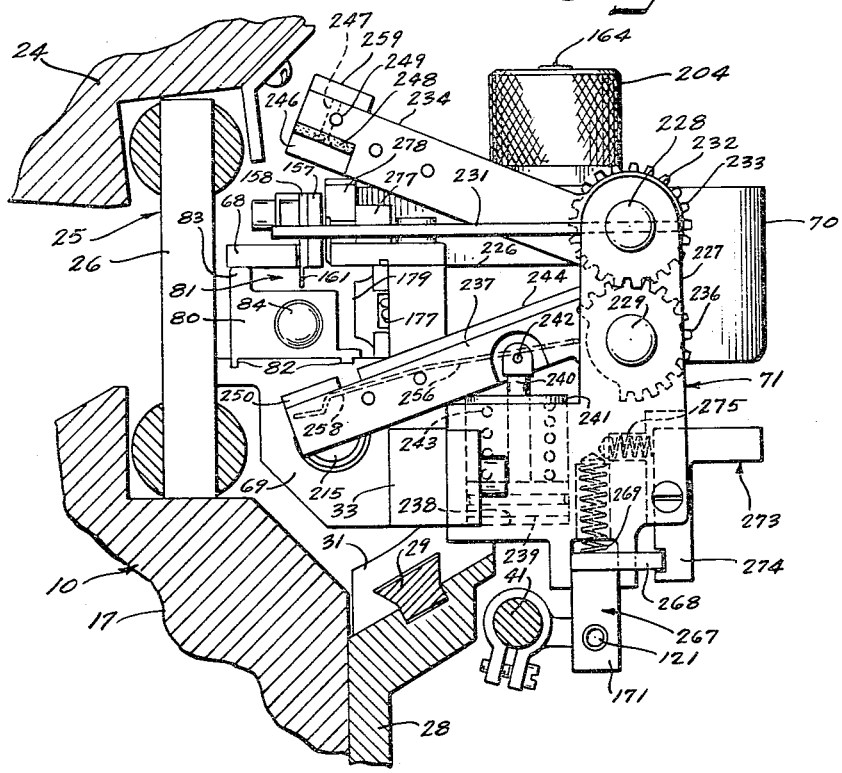

Dec. 18, 1956  H. C. FRENTZEL  2,774,388
SHUTTLE CONTROL
Filed Sept. 3, 1953  12 Sheets-Sheet 9
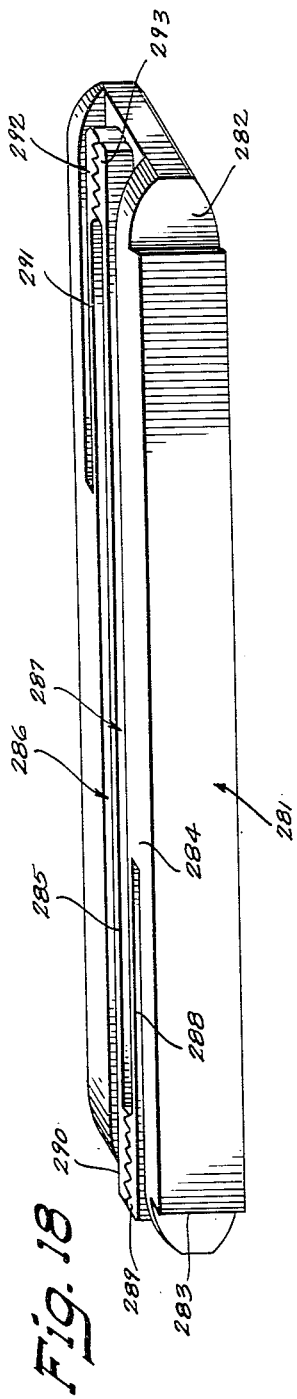
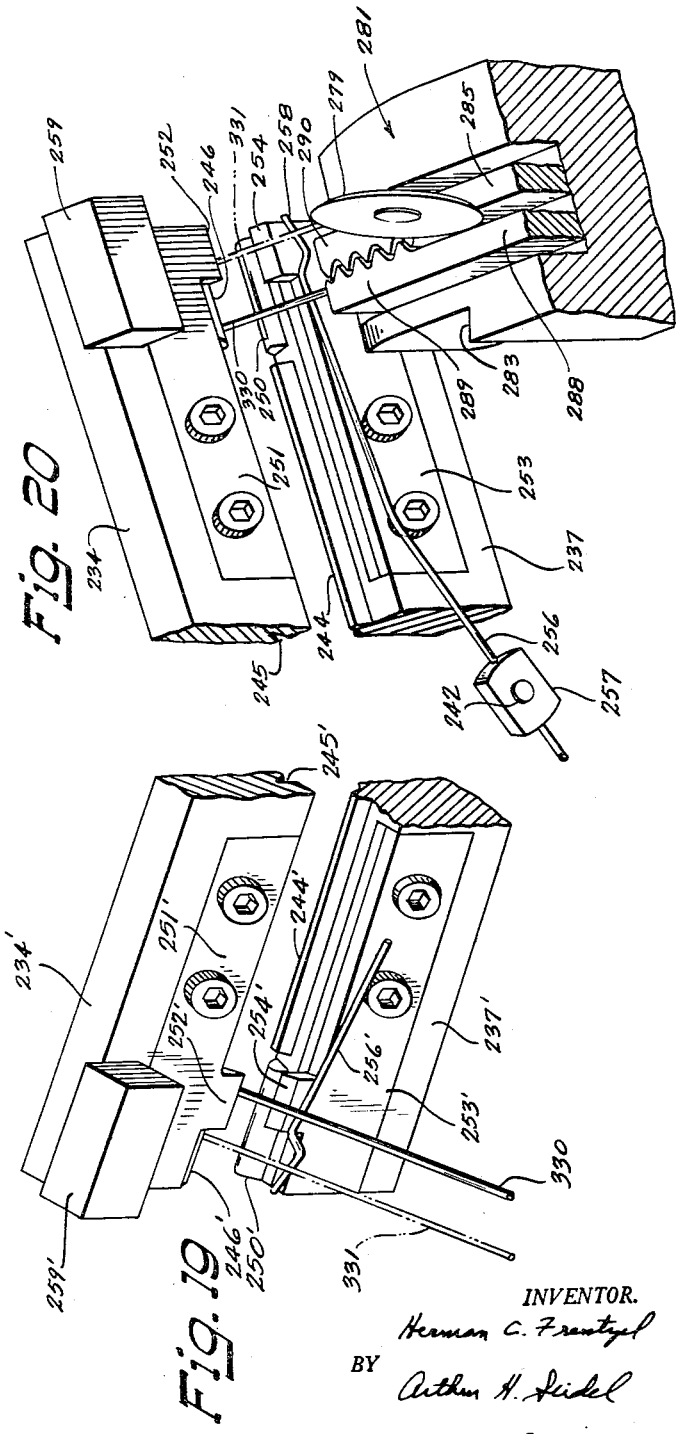
INVENTOR.
Herman C. Frentzel
BY Arthur H. Seidel
Attorney Dec. 18, 1956   H. C. FRENTZEL   2,774,388
SHUTTLE CONTROL Filed Sept. 3, 1953   12 Sheets-Sheet 10

INVENTOR.
Herman C. Frentzel
BY Arthur N. Seidel
Attorney

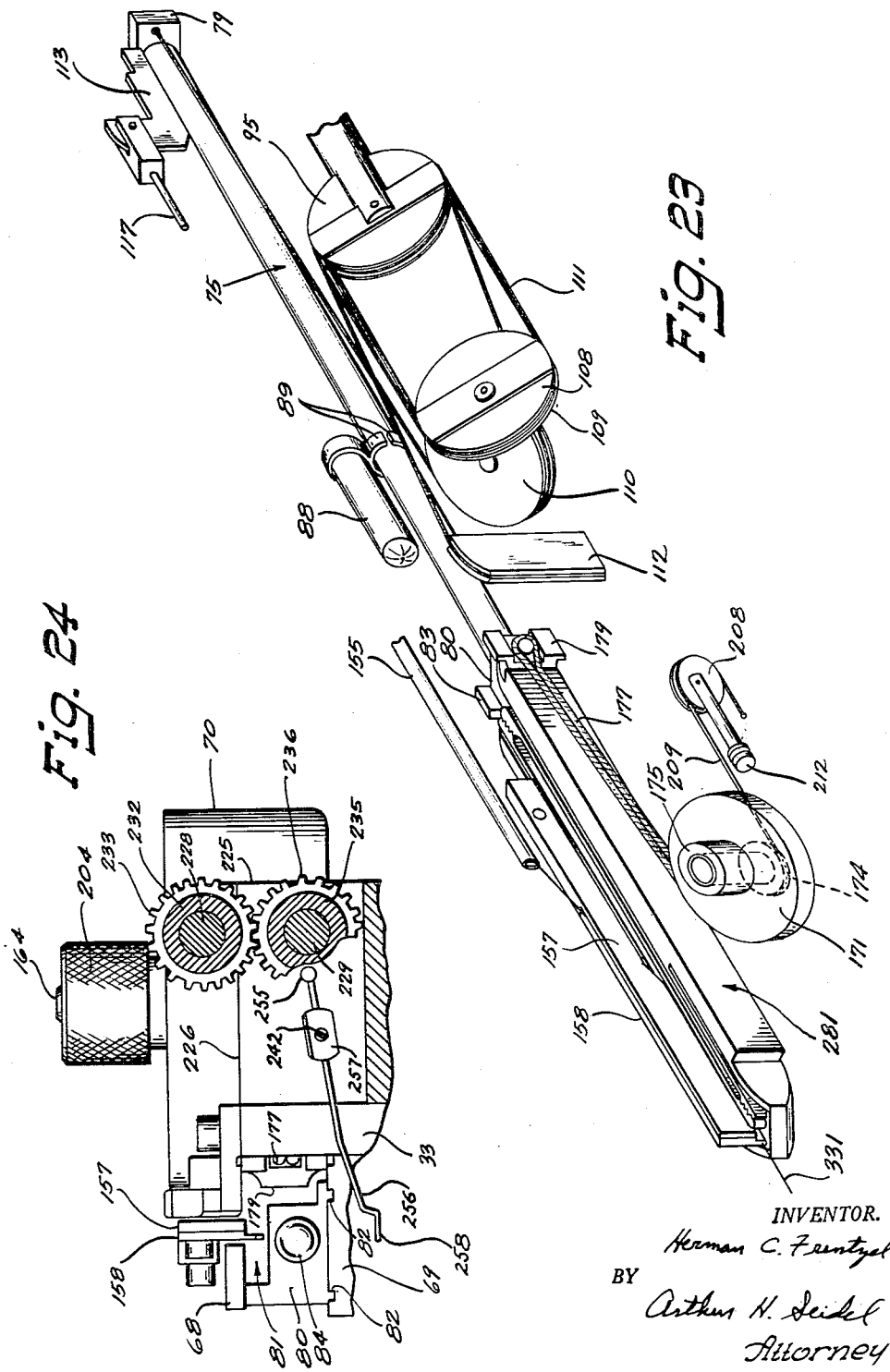

Dec. 18, 1956  H. C. FRENTZEL  2,774,388
SHUTTLE CONTROL
Filed Sept. 3, 1953  12 Sheets-Sheet 12

INVENTOR.
Herman C. Frentzel
BY Arthur H. Seidel
Attorney

United States Patent Office 2,774,388
Patented Dec. 18, 1956

2,774,388

SHUTTLE CONTROL

Herman C. Frentzel, Shorewood, Wis.

Application September 3, 1953, Serial No. 378,259

41 Claims. (Cl. 139—126)

This invention relates to looms and it more particularly resides in an improved apparatus for the laying of weft threads through a shed formed by warp threads advancing toward a beat line, one form of such apparatus may comprise in its more complete aspects a shuttle receiving box disposed at one end of the shed to provide a terminus for a shuttle in its flight through the shed with which is associated braking means for arresting the travel of a shuttle entering the box and homing elements for continuing the travel of the shuttle within the box to predetermined position making it ready for a return flight through the shed, which apparatus has a shuttle throwing member driven by a firing motor for throwing the shuttle from the box through the shed and means for engaging the shuttle with a weft as it departs from the box to draw the weft from a supply to the side of the cloth through the shed, there also being means for clearing weft from the shuttle that has been drawn through the shed and severing the weft from the supply, and retaining the weft in position for movement with the lay up to the beat line.

For weaving with wire it has been common to employ the pirn type shuttle that contains the supply of weft. The shed is then clear of obstruction after each passage of the shuttle to permit the heddle operation that closes and reopens the shed to effect the necessary shift of the warp threads. The quantity of weft that may be loaded in a shuttle utilizing a pirn is necessarily limited. An increase in the amount of a full load of weft necessitates resort to a larger size shuttle, and there is definite limitation as to optimum shuttle size. Thus, it becomes necessary to frequently interrupt the weaving process and reload the shuttle with a full pirn of weft. This frequent stoppage gives rise to inefficient manufacture. Furthermore, with frequent reloading the texture of the finished wire cloth will often be found to lack desired uniformity since the characteristics of the several loads of weft necessary to complete a cloth of any substantial length may vary considerably.

Resort is commonly made to pirn type shuttles of a size as large as practical limitations permit and the weight of such fully loaded shuttles presents a considerable inertia factor. Not only does the weft present considerable bulk, but the shuttles have been constructed of large size and weight to render sufficient durability, thus aggravating the inertia factor. Impact stresses encountered upon throwing and arresting the travel of fully loaded shuttles are large and have necessarily required the shuttle controlling equipment to be of rugged construction. Such equipment commonly employed has nevertheless been subject to frequent mechanical failure, and stoppage of the loom for the repair and replacement of parts has had material adverse effect upon the efficiency of manufacture with looms employing the pirn type shuttle.

In accordance with this invention, which relates principally to wire weaving looms, a low inertia shuttle is thrown back and forth through the shed. For each flight a weft thread, drawn off from a supply at the side of the cloth, is picked up by the shuttle and carried through the shed into position for the beat of the lay and is released from the shuttle upon the shuttle completing its flight through the shed. For the return flight the shuttle picks up a weft from a second weft supply at the side of the cloth from which flight now begins. The pirn is eliminated and the shuttle employed may be of light weight and reduced dimension. The inertia of such a shuttle remains constant, rather than varying as in the case of the pirn shuttle from which weft is stripped and the mass consequently reduced as weaving continues. With the lighter shuttle, velocities may be increased for a given shuttle energy that is to be absorbed by the braking members. The weaving rate can then be advantageously increased. In the practice of the invention advantage is taken of the shuttle employed to also provide improved means for accelerating and decelerating the shuttle that give enhanced control over shuttle action.

In a preferred embodiment of the invention a shuttle controlling apparatus is mounted at each end of the lay and the cycle of operation for throwing the shuttle and feeding a weft through the shed may be divided into four major operational steps for each of the two control apparatus, as follows:

1. Terminating a shuttle flight, that is initiated from the opposite control apparatus when the lay is near the retracted dwell position, by braking the shuttle to a halt, and then translating the shuttle to a position for optimum throw on a return flight and for tensioning a weft laid in the shed and held by the shuttle, 2. Clampingly engaging the weft near the end held by the shuttle and freeing the end from the shuttle before the lay moves up to the beat line, and then releasing the weft to permit the lay to retract from the weft after a beat has been made in which the weft has become a part of the woven cloth, 3. Throwing the shuttle in a return flight upon the lay assuming a position near or at the dwell position and engaging a weft drawn off from a supply at the side of the cloth in the shuttle, as it is thrown from the apparatus, to be carried thereby through the shed, and resetting the throwing and shuttle braking elements for the next cycle of operation, and 4. Severing the weft from the weft supply and clampingly engaging the cut weft end in position before the lay moves up to the beat line, and then releasing the weft end to permit the lay to retract toward the dwell.

It is an object of this invention to provide for the use of a substantially continuous weft supply from which a cloth of uniform texture may be woven.

It is another object of this invention to provide a shuttle control for a loom that eliminates the need of frequent shut down of the loom for replenishing the weft supply.

It is another object of this invention to provide a shuttle control for a loom that simplifies the tending of the loom.

It is another object of this invention to provide a shuttle control for a loom of rugged construction not susceptible of frequent breakdown and requiring a minimum of attention over an extended period of use.

It is a further object of this invention to provide for the use of a shuttle of low inertia not subject to change in value as weaving takes place that may be rapidly accelerated and decelerated in its flight.

It is a further object of this invention to employ a shuttle of reduced thickness to provide for a small shed opening during shuttle flight and enhanced heddle action.

It is still another object of this invention to provide in a shuttle control for a loom a shuttle throwing member of low inertia for quick acceleration of the shuttle to be thrown thereby through the shed, It is another object of this invention to provide a shuttle control for a loom that brakes a shuttle entering a shuttle box forming a part of the control and that then carries the shuttle to a terminal position disposed adjacent an ejector for optimum acceleration upon throw from the box.

It is another object of this invention to provide a shuttle control for a loom that may be shifted along the lay to accommodate for the weaving of cloths of different width.

It is another object of this invention to provide a shuttle control for a loom that operates in accordance with the four steps hereinbefore enumerated and requires only two triggering impulses to actuate movements of the control.

It is a further object of this invention to provide a shuttle control that is adaptable for installation on presently existing looms without the need of any extensive alteration or modification of such looms.

It is a further object of this invention to provide a brake for a shuttle having braking members not dependent upon contact with the shuttle for braking friction and which may be released from braking position to permit movement of the shuttle to a position for optimum throw.

These and other objects and advantages of this invention will appear in the description to follow. In the description reference is made to the accompanying drawings, which form a part hereof, and in which there is shown by way of illustration and not of limitation specific forms in which this invention may be embodied.

Figure 2:
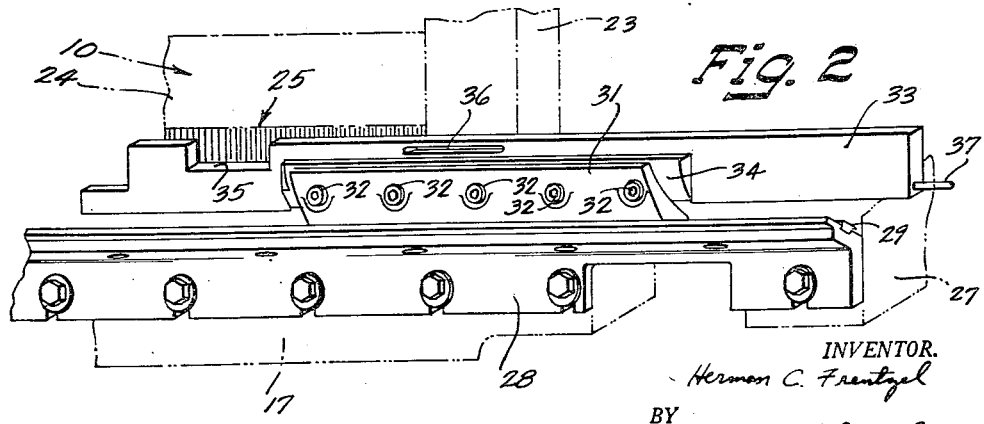
Figure 3:
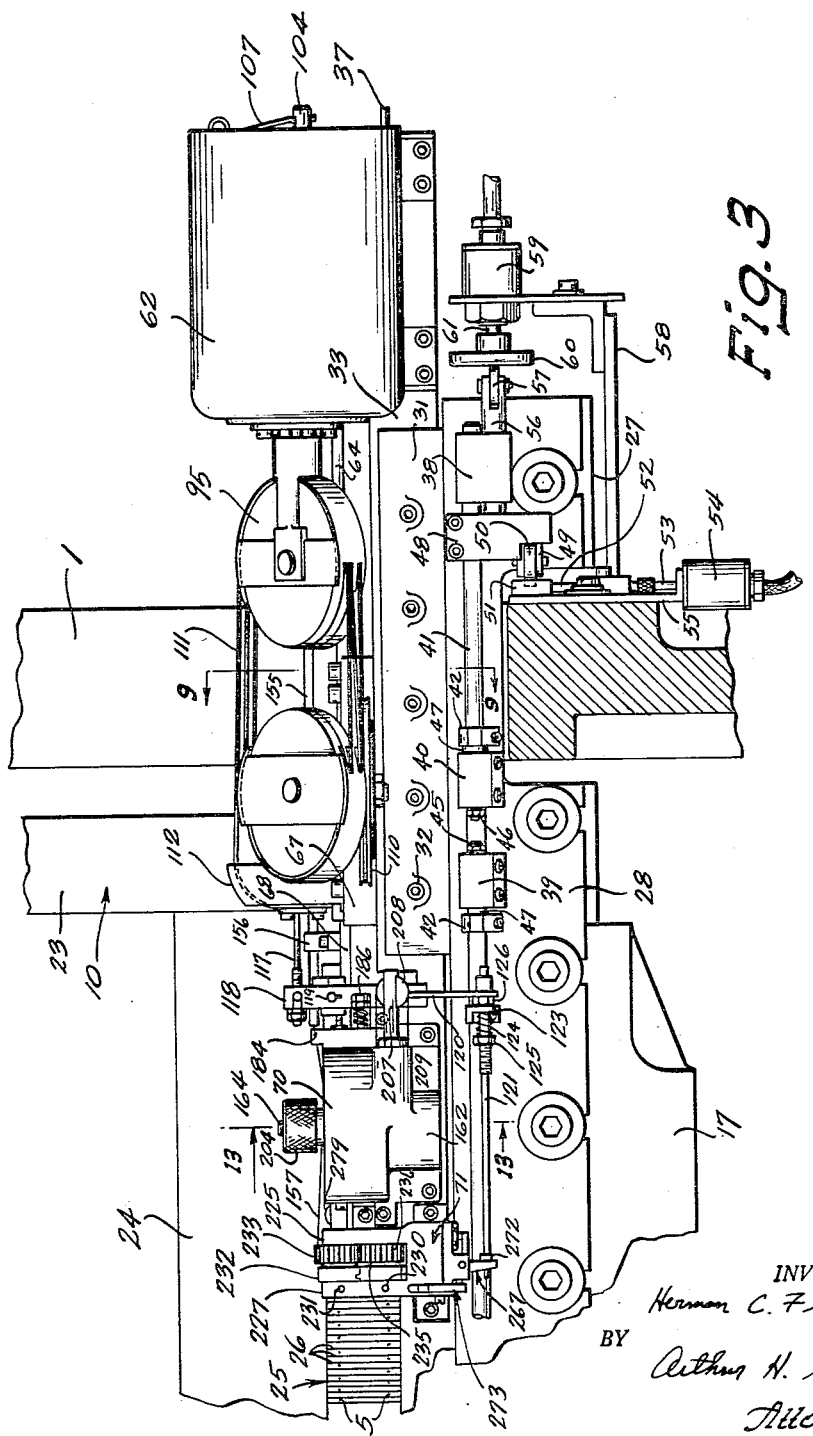
Figure 10:
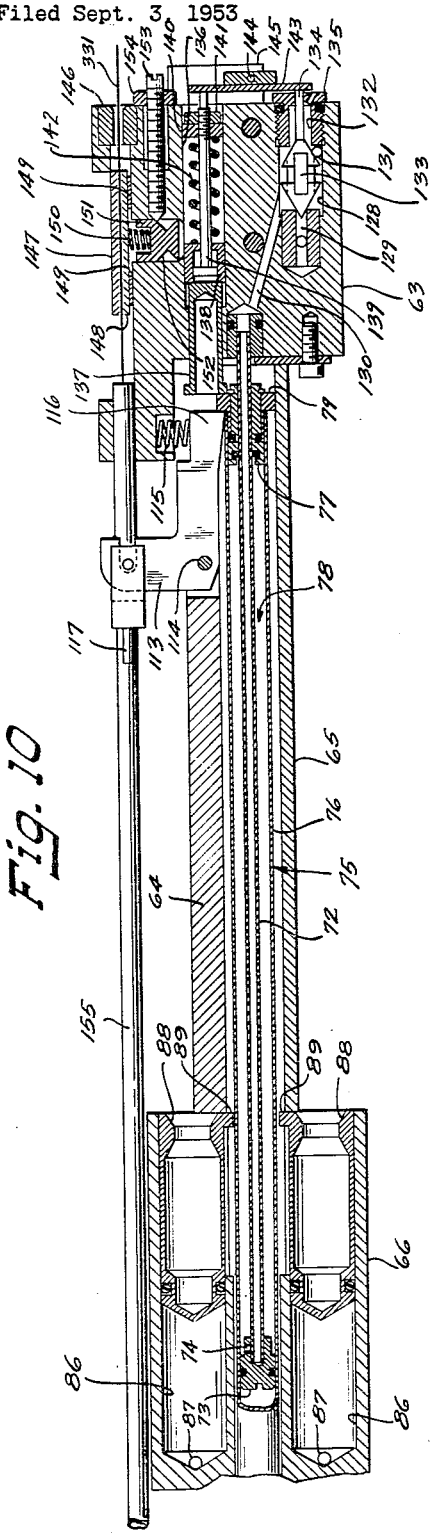
Figure 11:
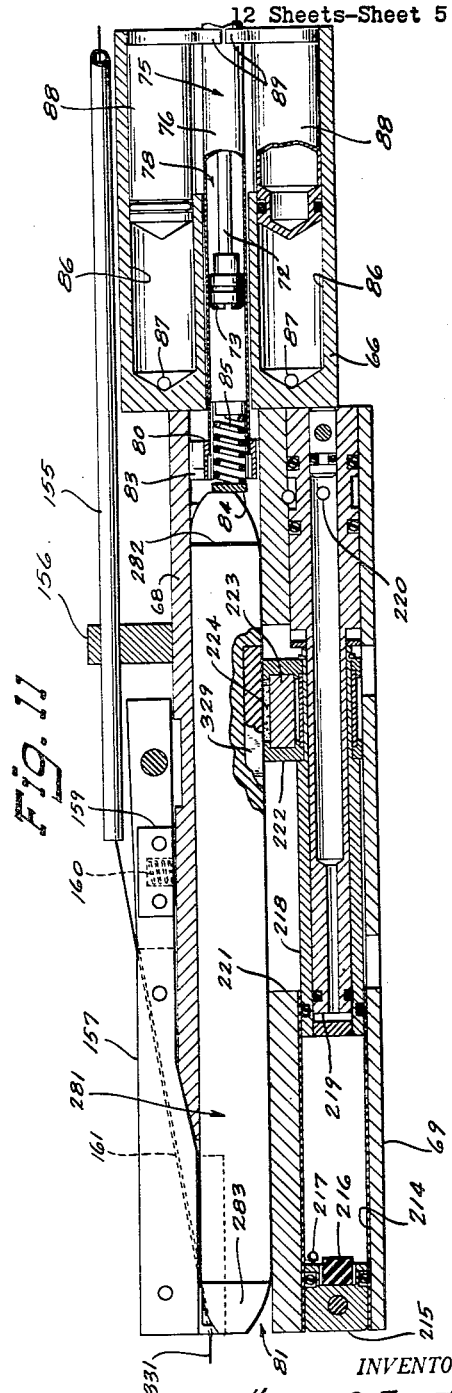
Figure 12:
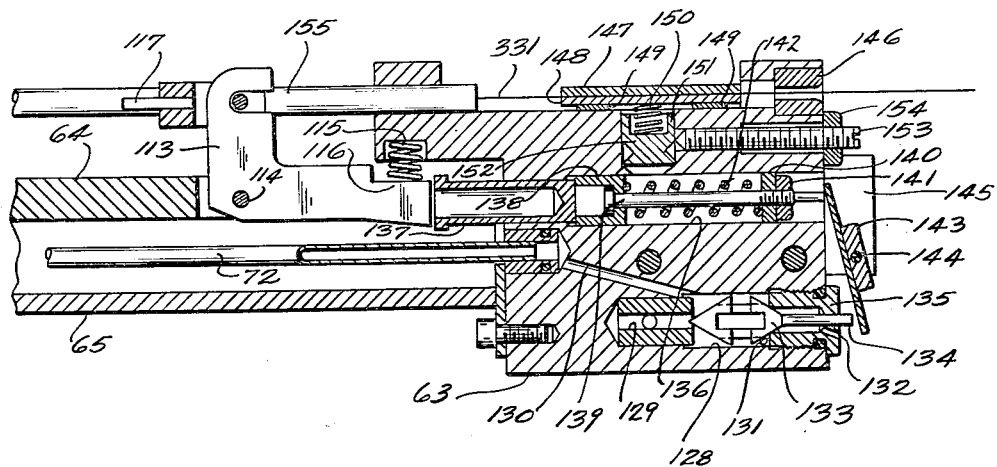
Figure 13:
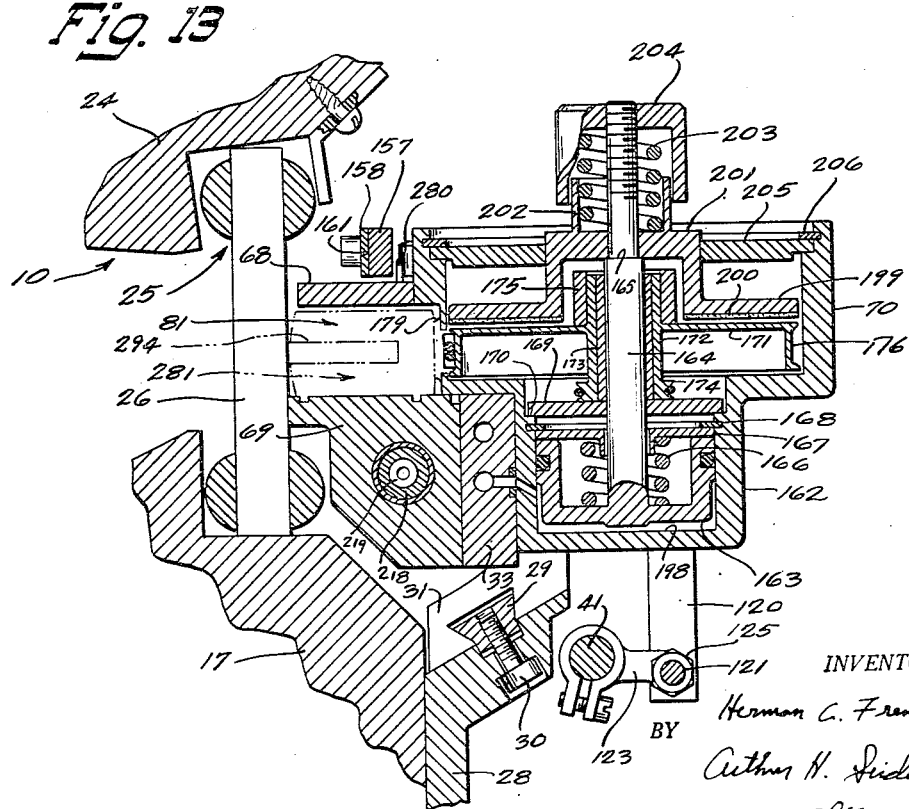
Figure 14:
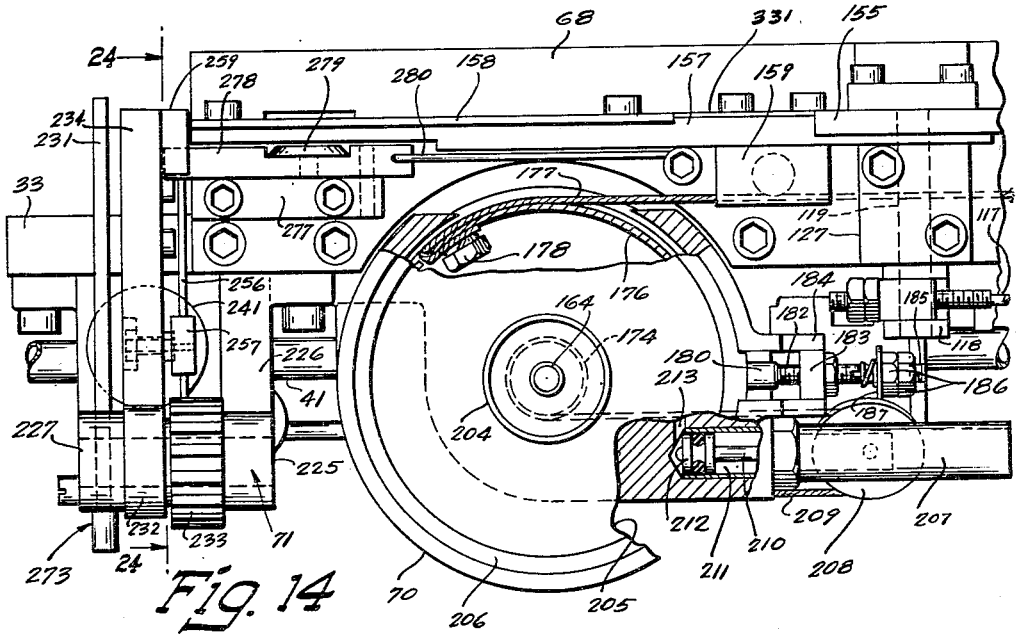
Figure 15:
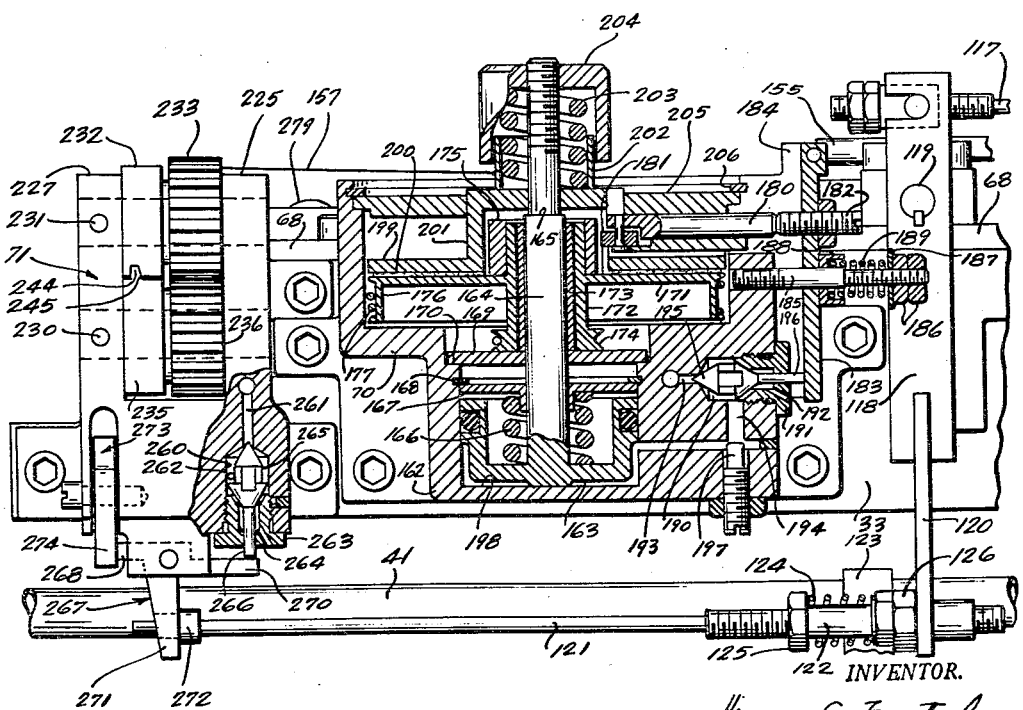
Figure 21:
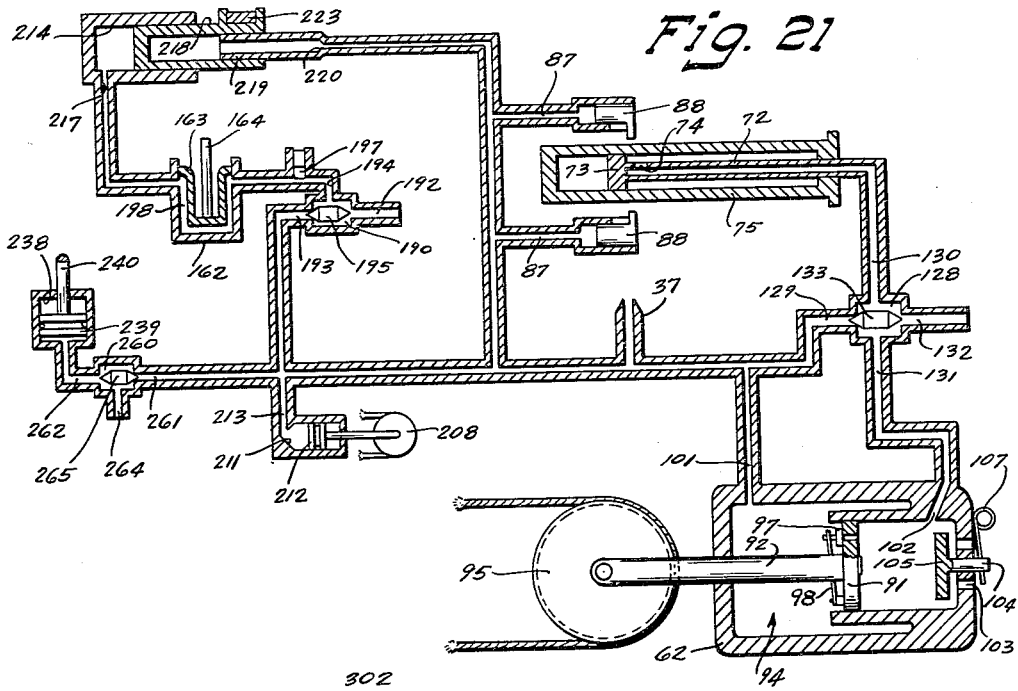
Figure 22:
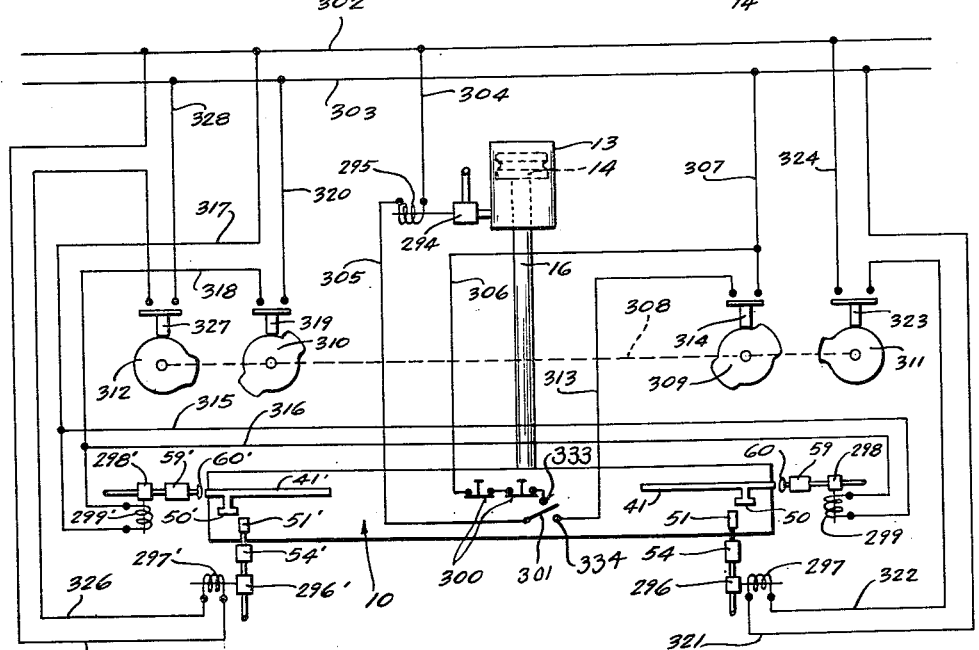
Figures 25, 26:
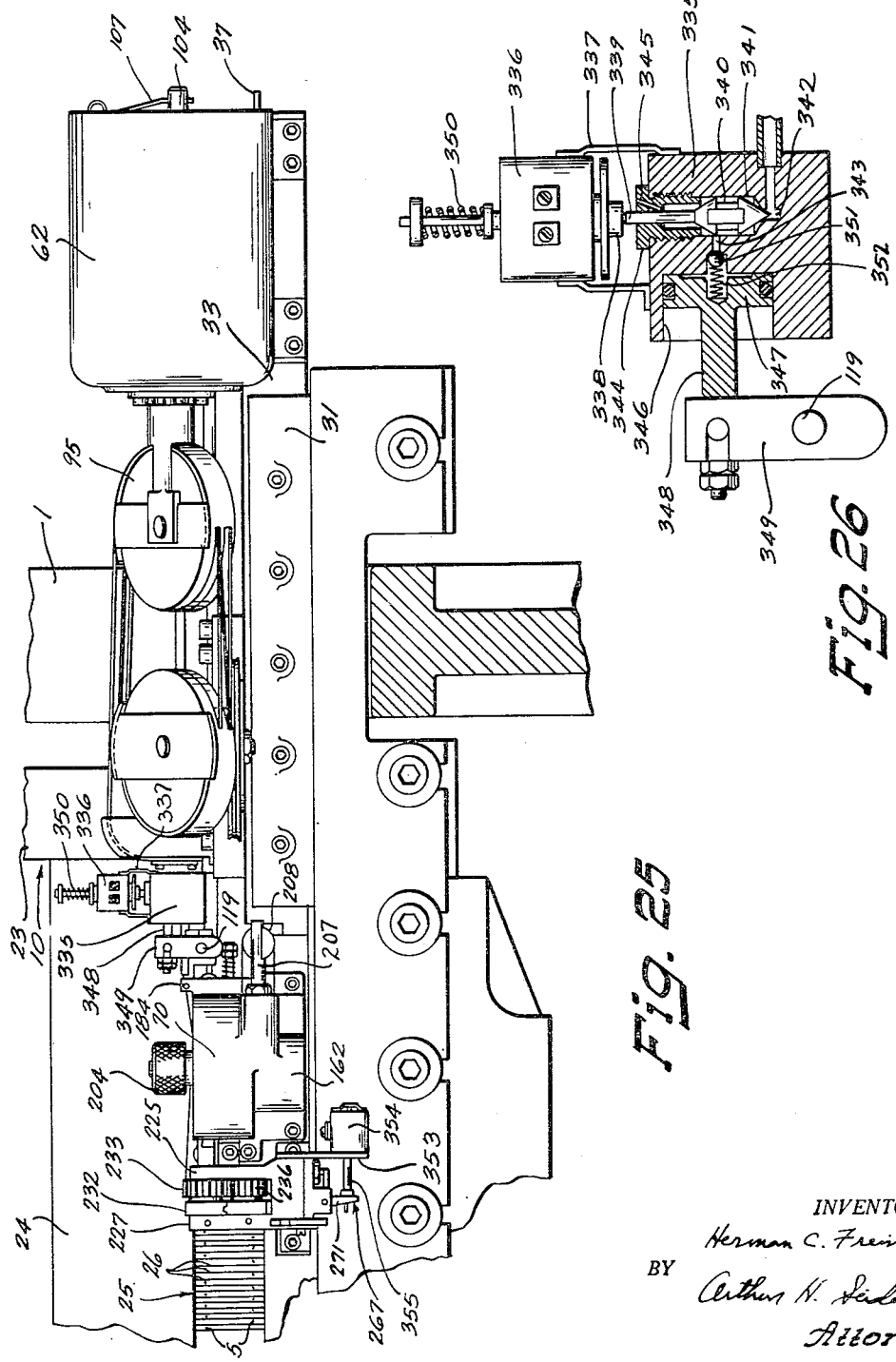

In the drawings:

Fig. 1 is a right hand side view in elevation of a loom embodying this invention in which parts not directly pertaining to the operation of the invention have been omitted, Fig. 2 is a fragmentary view in perspective of mounting members for shuttle controlling apparatus at the right hand end of the loom lay which form a part of this invention, Fig. 3 is a front view in elevation of shuttle controlling apparatus forming a part of this invention mounted at the right hand end of the loom lay, Fig. 4 is a top plan view of the apparatus shown in Fig. 3, Fig. 5 is a fragmentary view in elevation with parts broken away and in section of a mounting for a fire control rod forming a part of this invention, Fig. 6 is a fragmentary top plan view of the inside end of shuttle controlling apparatus mounted at the left end of the loom lay, Fig. 7 is a fragmentary front view in elevation with parts broken away and in section showing the firing motor for the shuttle controlling apparatus in Figs. 3 and 4, Fig. 8 is an outside end view in elevation of the shuttle controlling apparatus in Figs. 3 and 4, Fig. 9 is a view in section of the shuttle controlling apparatus viewed through the plane 9—9 in Fig. 3, Fig. 10 is a fragmentary longitudinal view in section of the shuttle controlling apparatus viewed through the plane 10—10 in Fig. 4, Fig. 11 is a fragmentary longitudinal view in section of the shuttle controlling apparatus viewed through the plane 10—10 in Fig. 4, Fig. 12 is a fragmentary longitudinal view in section of a portion of the shuttle controlling apparatus viewed through the plane 10—10 in Fig. 4 with parts thereof in an alternate position from that shown in Fig. 10, Fig. 13 is a view in section of the shuttle controlling apparatus viewed through the plane 13—13 in Fig. 3, Fig. 14 is a fragmentary top plan view of the inside end of the shuttle controlling apparatus with parts broken away and in section, Fig. 15 is a fragmentary front view in elevation of the inside end of the shuttle controlling apparatus with parts broken away and in section, Fig. 16 is an inside end view in elevation of the shuttle controlling apparatus shown in Figs. 3 and 4, Fig. 17 is a fragmentary rear view in elevation of the inside end of the shuttle controlling apparatus shown in Figs. 3 and 4, Fig. 18 is a view in perspective of a shuttle employed with this invention, Fig. 19 is a fragmentary view in perspective of the weft nip and clamp arms of shuttle controlling apparatus mounted at the left hand end of the loom lay, Fig. 20 is a fragmentary view in perspective of the weft nip and clamp arms of the shuttle controlling apparatus mounted at the right hand end of the lay, Fig. 21 is a schematic view of the fluid pressure connections for the shuttle controlling apparatus, Fig. 22 is a wiring diagram of a circuit for operating the lay and shuttle controlling apparatus, Fig. 23 is a fragmentary view in perspective showing the relation of portions of the shuttle controlling apparatus with a shuttle, Fig. 24 is a fragmentary view with parts broken away and in section near the inner end of the apparatus viewed through the plane 24—24 shown in Fig. 14, Fig. 25 is a front view in elevation of an alternative form of shuttle controlling apparatus in which this invention is embodied, and Fig. 26 is a fragmentary view in elevation with parts broken away and in section of a portion of the apparatus shown in Fig. 25.

Referring now to the drawings and more specifically to Fig. 1, there is shown a right hand side frame 1 of a loom 2. A breast beam 3 is joined to the frame 1 at the front of the loom 2 and a warp roll 4 is rotatably mounted at the rear of the frame 1. Warp roll 4 carries a supply of warp threads 5 that are passed forwardly through heddles 6 to form a shed opened and closed by the usual heddle motion. The beat line 7 is at the apex of the shed and woven cloth 8 passes about the breast beam 3 and is wound upon a cloth roll 9 that is rotatably mounted beneath and to the rear of the breast beam 3. The loom 2 has a left hand side frame, not shown, similar to the right hand side frame 1 that supports the opposite ends of the breast beam 3 and rolls 4 and 9.

A lay 10 has a right hand side arm 23 that threadedly receives at its upper end an adjustable pivot 11 with a pointed end seated in a rack 12 secured to the top of the right hand side frame 1. A similar pivot and rack are provided at the opposite end of the lay 10 to furnish a mounting that permits swinging movement between a rearwardly retracted position termed the dwell shown in Fig. 1, and a beat position wherein the lay 10 is advanced forwardly to the beat line 7. A pneumatic lay retraction cylinder 13 having a piston 14 is mounted on a stand 15 behind the lay 10. A piston rod 16 extends from the cylinder 13 and connects to the underside of the lay bottom 17. By alternately charging and venting the cylinder 13 the lay 10 may be retracted to the dwell position and permitted to fall forwardly to the beat position. A rod 18, also connected to the lay bottom 17, is joined through a pivoted link 19 to one end of a coil spring 20. The spring 20 urges the lay 10 forwardly toward the beat line 7 to augment the blow imparted by the lay 10 upon making a beat.

A pair of upright stands 21, one of which is shown, are disposed at the sides of the loom 2 to support weft supply spools 22. Each spool 22 is disposed to have the weft threads wound thereon spun off from the inside end of the spool facing the loom while the spool remains stationary.

Referring now more specifically to Fig. 2, there is shown in phantom the lower right hand end of the lay 10. The lay portion depicted comprises the right hand side arm 23 that supports a horizontal lay cap 24. Spaced beneath the lay cap 24 is the lay bottom 17 and held between the cap 24 and the bottom 17 is the reed 25 comprised of a plurality of thin closely spaced dents 26. The warp threads 5 are led in the usual manner from the heddles 6 through the openings between the dents 26, as shown in Figs. 3 and 4. The lay bottom 17 has an extension 27 to the right of the side arm 23 and bolted to the lay bottom 17 and its extension 27 is a flanged mounting member 28. A dovetail track 29 is seated on the upper face of the flanged portion of the member 28 and is secured by mounting screws 30, one of which is clearly shown in Fig. 13. Mounted on the track 29 is a bracket 31 that may be slidably moved along the flanged member 28. To retain the bracket 31 in desired position the screws 30 are brought up tight to cause the dovetail track 29 to act as a clamp that holds the bracket 31 against the flanged member 28.

Referring again to Fig. 2, a set of mounting bolts 32 are passed through vertical slots, not shown, in the bracket 31 and are threadedly received by a backbone 33 which forms the principal mounting member for the shuttle controlling apparatus of this invention. In Fig. 2 the backbone 33 is shown stripped of the elements mounted thereon for purposes of illustration. When drawn up tightly the bolts 32 clamp a curved mounting face 34 of the backbone 33 against a mating surface of the bracket 31 and upon loosening the bolts 32 the backbone 33 may be tilted to a position of alignment with the reed 25. The backbone 33 has a notch 35 near the inside end and a horizontal slot 36 disposed near the mid portion. An air inlet nipple 37 extends from the right hand, or outside, end of the backbone 33 that leads to passageways, not shown, that form a part of a fluid pressure control system diagrammatically represented in Fig. 21.

*The triggering elements*

Passing now to Figs. 3 and 8, a bearing block 38 is secured on the underside of the flange of the mounting member 28 and spaced to the left of the block 38 is a pair of centering cylinders 39 and 40 that are likewise attached to the underside of the flange of the mounting member 28. Cylinders 39 and 40 are more clearly shown in Figs. 5 and 9. A freely slidable fire control rod 41 is borne at its outside end by the block 38 and extends through the centering cylinders 39 and 40. A pair of connectors 42, see Figs. 5 and 9, are firmly secured to the rod 41 and each receives the end of a pin 43 that passes through a cylindrical cavity 44 in an associated centering cylinder 39, 40. The opposite ends of the pins 43 are threaded to receive a nut 45 to limit pin movement. A coil spring 46 is compressed in each cavity 44 by a plug 47 encircling and integral with the respective pins 43. The plugs 47 are urged against the connectors 42 to retain the rod 41 in a centered position. This rod centering assembly provides support for the rod 41 and upon a shift of the rod 41 in either axial direction it is returned to centered position upon release of the thrust causing the shift.

A depending block 48 is clamped to the fire control rod 41 to the immediate left of the bearing block 38 and a bracket 49 pivoted for limited movement in a horizontal plane at the bottom of the block 48 carries a roller 50. The bracket 49 is free to pivot rearwardly against a biasing spring, not shown, from the position shown in Figs. 3 and 8, but is restrained from swinging forwardly. A vertically movable firing cam 51, shown in Figs. 1 and 3, which may be raised to engage the roller 50, is carried on a stem 52 that is in turn connected to the piston rod 53 of an air cylinder 54. The cylinder 54 and the stem 52 are supported by a bracket 55 mounted on the side frame 1 of the loom 2.

A stub shaft 56 is borne by and extends through the bearing block 38. The left hand end of the shaft 56 engages the depending block 48 and the right hand end carries a roller 57. The bracket 58 extends outwardly from the side frame 1 and mounts an air cylinder 59 having a cam plate 60 secured on the piston rod 61 for limited inward and outward movement. Inward movement of the cam plate 60 will cause engagement with the roller 57 to occur as the roller 57 is swung by the movement of the lay 10. Upon the roller 57 engaging and riding over the cam plate 60 the fire control rod 41 will be moved inward. Outward movement of the rod 41 will occur upon the roller 50 engaging and riding over the firing cam 51.

*The backbone assembly*

The backbone 33, clearly shown in Fig. 2, forms a principal mounting frame for the apparatus. Secured to the top and front face at the right hand end of the backbone 33 is a firing motor cylinder 62, which is clearly shown in Figs. 3, 4, 7 and 8. On the back face of the backbone 33 and directly behind the cylinder 62 is a valve block 63, which is clearly shown in Figs. 4, 8, 10 and 12. To the left of the firing motor cylinder 62 and the valve block 63 is a cover plate that extends rearwardly of the backbone 33, as is clearly shown in Figs. 4, 10 and 12. A floor 65, shown in Figs. 10 and 12, is directly beneath the cover plate 64 and immediately to the left of the cover plate 64 and the floor 65 is an arresting cylinder block 66. A firing sheave bracket 67 is disposed to the front of the cylinder block 66, as shown in Figs. 4 and 9.

A shuttle box cover 68 is secured to the upper face of the backbone 33 at the left hand, or inside end. The cover 68 overhangs to the rear of the backbone 33 and beneath the cover 68 is a shuttle box floor 69 secured to the back face of the backbone 33. The floor 69 and cover 68 form with the backbone 33 and the cylinder block 66 a recess open both at the inside end and the back, which recess is termed a shutle box and has been given the designating reference numeral 81. This portion of the apparatus is most clearly shown in Figs. 4, 11, 13, 14 and 16. Referring now to Figs. 3 and 4, there is shown to the front of the shuttle box 81 a brake housing 70 and to the left of the housing 70 a weft nip and clamp unit 71, each being secured to the front face of the backbone 33.

*The shuttle throwing ram and travel arresting means*

Referring now particularly to Figs. 10 and 11, the outside end of small diameter quill 72 is received in the valve block 63 and extends to the left between the floor 65 and cover plate 64. A cap 73 fits over the inside end of the quill 72 and a small opening 74 leads from the interior of the quill 72 to the exterior. The body of a shuttle throwing ram 75 in the form of a thin walled sleeve 76 that fits tighly about the quill cap 73 surrounds and is concentric with the quill 72. Inserted in and brazed to the right hand end of the sleeve 76 is a head 79 that is held in position by the top plate 64 and floor 65 to guide movement of the ram 75 and which also serves as a catch in a manner to be described. A bushing 77 is disposed within the ram 75 and extends through the head 79 to be held in place by a lock ring. The bushing 77 fits snugly about the quill 72 to form with the quill cap 73 a chamber 78 within the sleeve 76, the volume of which varies with the position of the ram 75 as it slides along the quill 72.

A sliding guide block 80, more clearly shown in Figs. 11 and 16, is secured to the inner end of the sleeve 76 that extends within the shuttle box 81. The guide block 80 has a pair of toes 82 that ride in complementary grooves in the top face of the shuttle box floor 69 and has an upwardly extended ear 83 to bear against the underside of the shuttle box cover 68. A shuttle engaging nose piece 84 projects beyond the guide block 80 and is an integral extension of a coil spring 85 seated within the sleeve 76.

Referring now to Figs. 9, 10 and 11, the arresting cylinder block 66 has a pair of cylindrical cavities 86 disposed above and beneath the sleeve 76. Each cavity 86 has an inlet port 87 directly connected with a source of fluid pressure as shown in Fig. 21. A hollow piston 88 is slidably received in each cavity 86 and each is retained within the cylinder block 66 by the upper cover 64 and floor 65 respectively. A semi-circular collar 89, clearly shown in Fig. 9, extends from each piston 88 and encircles a portion of the sleeve 76. The collars 89 are disposed within the path of travel of the head 79 of the ejector ram 75 to arrest the movement of the ram 75 when it is thrown toward the left in a fashion to be described. Engagement of the head 79 with the collars 89 will move the pistons 88 inwardly to compress the fluid in the cavities 86 that is at line pressure to effect a braking of the ram 75.

The firing motor

As shown in Fig. 7, a cylinder liner 90 with an internal bore is received in the right hand end of the firing motor cylinder 62 and a piston 91 is, in turn, received within the core 90. The liner 90 extends for approximately one-half the length of the cylinder 62 and opens upon a large chamber 94 forming the left hand end of the cylinder 62. The piston 91 has a hollow shaft 92 that slides within a sleeve 93 mounted on the end wall of the chamber 94 and extends to the exterior of the cylinder 62. Threadedly attached to the exterior end of the shaft 92 is a movable sheave block 95.

A port 96 is inserted in the face of the piston 91 to form a passage leading from the chamber 94 to the right hand side of the piston 91 and a valve 79 is held on the deflectable end of a spring arm 98 in a position to open and close the port 96. Spring arm 98 is secured to the side of the piston 91 facing the chamber 94 and normally holds the valve 97 open. A button 99 of resilient material is attached to the deflectable end of the spring arm 98 and a plate 100 is mounted on the sleeve 93 to intercept the button 99 upon the piston 91 being moved to the position shown in phantom in Fig. 7.

The large chamber 94 of the cylinder 62 has an inlet port 101, that is shown only in Fig. 21, which is connected to a fluid pressure source to retain line pressure within the chamber 94 at all times. A second port 102 for the cylinder 62 enters on the right hand side of the piston 91, as shown in Fig. 7, and leads into the valve block 63 as will be described. A number of circularly spaced vent openings 103 are arranged concentrically in the end wall of the cylinder liner 90 about a valve stem 104 that extends through the liner 90. A large valve head 105 is carried by the stem 104 within the cylinder 62 to open and close the vent openings 103 and a resilient block 106 is secured to the back of the valve head 105 in position to be struck by the piston 91 as it moves into the position shown in Fig. 7. The external end of the stem 104 receives the deflectable end of a coil spring 107 mounted on the face of the cylinder liner 90 that urges the valve head 105 to open position.

The movable sheave block 95 comprises a set of three sheaves and, as clearly shown in Fig. 9, the firing sheave bracket 67 mounts a pair of sheaves 108 and 109 that are tilted in the plane of the sheave block 95. A third sheave 110 is rotatably mounted on the underside of the sheave bracket 67 in horizontal position and enters the slot 36 in the backbone 33 which opens into the space between the cover plate 64 and floor 65. A firing cord 111 has a dead end fixed to an upright post 112 on the bracket 67 and leads therefrom to the uppermost sheave of the movable sheave block 95. The cord 111 passes back to the bracket 67 to pass around the top sheave 108 and hence back to the sheave block 95. Cord 111 then leads to sheave 109 and back again to sheave block 95 from which it passes to the horizontal sheave 110. Passing about sheave 110 the cord 111 runs behind the backbone 33 to a connection with the bushing head 79 at the rear end of the shuttle throwing ram 75, as shown in Fig. 23.

The firing and reset elements

Referring now to Figs. 10 and 12, a firing latch 113 is pivotally mounted on a pin 114 held in the cover plate 64. A spring 115 housed in the valve block 63 presses downwardly upon the latch finger 116 that forms an integral portion of latch 113 to block the head 79 on the throwing ram 75 from moving inwardly. A strut 117 is connected at one end to the latch 113 and extends obliquely inwardly, as shown in Figs. 3 and 4, to a connection with a lever 118, clearly shown in Figs. 15 and 16. The lever 118 is pivotally mounted on a shaft 119 borne in a bearing block 127 attached to the shuttle box cover 68. A depending extension 120 integral with the lower end of lever 118 supports one end of a shaft 121 positioned to the front of the fire control rod 41, as is shown in Figs. 13 and 15. The shaft 121 is threaded at the right end and is surrounded by a sleeve 122 that extends through the lever extension 120. A connector 123 on the sleeve 122 is clamped to the fire control rod 41 and a spring 124 is disposed between a nut 125 on the shaft 121 and the connector 123. A bushing 126 is inserted between the lever extension 120 and the connector 123.

Referring again to Figs. 10 and 12, the valve block 63 has a chamber 128 with an inlet port 129 for connection to a fluid pressure source to provide line pressure, a first outlet 130 running to the quill 72, a second outlet 131 connected with the inlet port 102 of the firing cylinder 62, and a vent 132 that passes through a cap 135 enclosing the end of the chamber 128. A double headed valve 133 is seated in the chamber 128 to alternately close the inlet port 129, as shown in Fig. 10, and the vent 132, as shown in Fig. 12, and a valve stem 134 extends through the cap 135 to the exterior of the block 63.

A cylindrical opening 136 extends through the block 63 above the valve chamber 128 and a bushing 137 projects from the inside end of the passage 136 to abut the head 79 of the throwing ram 75. Inside the passage 136 a cup shaped spring seat 138 is held against the bushing 137 and the headed end of a stem 139 is received in the seat 138. The stem 139 receives a second spring seat 140 at the opposite end that bears in the passage 136 for sliding movement, and a lock nut 141 retains the spring seat 140 in position on the stem 139. A coil spring 142 is inserted between the spring seats 138, 140 and the outer end of the stem 139 overhangs beyond the block 63 to be exposed above the valve stem 134. Spanning the exposed ends of the stem 139 and valve stem 134 is a lever 143 pivoted on a pin 144 held by a pair of ears 145 extending from the block 63.

The weft feed

A weft receiving eye 146 is mounted above the outside end of the block 63, as shown in Figs. 8, 10, and 12. To the left of the eye 146 and also above the block 63 is a fixed horizontal plate 147. A vertically displaceable plate 148 is directly beneath the plate 147 and is held from horizontal shift by a pair of guide pins 149. Acting upwardly upon the underside of the displaceable plate 148 is a spring 150 seated in a vertically adjustable spring seat 151 housed in the block 63 that has a triangular groove 152 running about its circumference. A pointed set screw 153 that works in the block 63 engages the wall of the groove 152 to vary the vertical position of the spring seat 151, and a lock nut 154 may be brought up tight to hold the set screw 153 in place.

To the left of the plates 147, 148 is a weft guide in the form of a tube 155 that extends above the cover plate 64, the arresting cylinder block 66 and a portion of the shuttle box cover 68. The left hand end of the tube 155 is supported by a bracket 156 fastened upon the shuttle box cover 68 and extending beneath and beyond this end of the tube 155 is a feather 157 carried by the shaft 119 to pivot therewith. The feather 157 extends to the end of the shuttle box cover 68, as shown in Figs. 11 and 14, and a thin blade 158 mounted on the side of the feather 157 projects downwardly into the shuttle box 81 upon the feather 157 being disposed in the lower position of Figs. 11 and 16. An obliquely downwardly extending opening 161 enters the blade 158 at the upper outer end and emerges at the lower left. Mounted on one side of the feather 157 is a spring seat 159 that houses a spring 160 that works against the shuttle box cover 68 to urge the feather 157 into a normal position of tilt lifting the blade 158 out of the shuttle box 81.

*The shuttle brake and the homing elements*

Referring now more specifically to Figs. 13, 14 and 15, the lower portion of the brake housing 70 is shown as a bowl 162 in which is snugly received a vertically movable cup 163. Integral with and rising from the bottom of the cup 163 is a shaft 164 with a shoulder 165 and that is threaded at its upper end which extends above the housing 70. A coil spring 166 encircling the shaft 164 seats within the cup 163 and a cup cover 167 held by a retaining ring 168 holds the spring 165 in compression to urge the cup 163 downwardly. A circular plate 169 rests on a ledge 170 at the top of the bowl 162 and standing upon the plate 169 is a rotatable brake disc 171 with a vertical hub 172 riding on a sleeve bearing 173 encircling the shaft 164. The lower end of the hub 172 terminates in a pulley 174 and the upper portion of the hub 172 above the brake disc proper 171 is ringed by a cam 175 keyed in position to rotate with the hub 172. Integral with the periphery of the brake disc 171 is a depending flange 176 to which one end of a brake cord 177 is secured by a stub bolt 178, as shown in Fig. 14. The opposite end is attached to a shuttle catch 179, shown in Figs. 16 and 23, that slides in grooves in the shuttle box cover 68 and floor 69. The brake cord 177 may be wound around the flange 176 to draw the shuttle catch 179 toward the open end of the shuttle box 81, or unwound, as shown in Fig. 14, to rotate the brake disc 171 as the shuttle catch 179 is moved toward the closed end of the box 81.

A vertically displaceable non-rotatable brake disc 199 with a brake lining 200, of a suitable material such as cork, is in facing relation with the upper face of the rotatable brake disc 171. A bell housing 201 rises upwardly from the center of the disc 199 to enclose the hub 172 and cam 175 and fits closely about the shaft 164 at a point above the shoulder 165 to be engaged thereby upon the cup 163 being raised upwardly. A collar 202 sets on the top of the bell housing 201 concentrically with the shaft 164 and seated within the collar 202 is a coil spring 203. Threadedly received on the upper end of the shaft 164 is a cap 204 that envelops the spring 203 and retains it in compression to urge the brake disc 199 into engagement with the lower brake disc 171. Closing the top of the brake housing 70 is a cover 205 held by a retaining ring 206 and which has a central opening to closely encircle the bell housing 201.

A horizontal pin 180 closely fits within an opening in the brake housing cover 205 with one end rotatably mounting a small diameter roller 181 disposed to bear against the cam 175 and be moved radially outward. The outer end of the pin 180 abuts a set screw 182 in a downwardly hanging lever 183 pivoted at the top to a bracket 184 extending to the right of the housing 70. An adjustment shaft 185 extending through the lever 183 is threaded at one end received in the housing 70 and a pair of nuts 186 are carried at the opposite end. A washer 187 encircling the shaft 185 is held against the nuts 186 by one end of an expansion spring 189 that seats at its other end in a spring seat 188 also on the shaft 185. The spring seat 188 is held against the lever 183 by the expansion spring 189 to move the set screw 182 against the pin 180.

As shown in Fig. 15, a valve chamber 190 is drilled in the base of the brake housing 70 and is closed by a threaded cap 191 that has a vent opening 192. An inlet port 193 connected direct to line pressure enters the chamber 190 from the left and an outlet port 194 is in the bottom of the chamber 190.

A double headed valve 195 in the chamber 190 may be reciprocated between a position closing the inlet port 193, in which event the vent opening 192 is open, and a position closing the vent opening 192, in which instance the inlet port 193 is open. A valve stem 196 for the valve 195 extends through the cap 191 to the exterior in position to be engaged by the lower end of the lever 183. The outlet port 194 leads past an adjustable flow regulating valve 197 into a chamber 198 formed between the bowl 162 and the cup 163.

There is shown in Figs. 3, 4 and 14 a tubular slotted pulley guide 207 extending from the right front of the housing 70 having a pulley 208 over which a brake wind up cord 209 passes. The cord 209 is secured at one end to the pulley 174 at the base of the brake disc hub 172 and is dead ended to the housing 70 at its other end. The pulley 208 is fastened to the end of a piston shaft 210 that enters the pulley guide 207 from within a cylinder 211 in the housing 70. A piston 212 rides in the cylinder 211, shown in Fig. 14, and a port 213 for the cylinder 211, leads direct to line pressure.

Referring again to Fig. 11, the shuttle box floor 69 is shown in longitudinal section. A cylindrical opening 214 at the inner end is closed by a plug 215 that has a resilient stop 216 on the inner side. An inlet port 217 is adjacent the plug 215 and a tubular piston 218 enters the cylinder 214 from the right. The tubular piston 218 closely surrounds a tubular rod 219 upon which it slides. The rod 219 forms a chamber within the piston 218 and an inlet port 220 connected directly to line pressure discharges through the rod 219 into the chamber within the piston 218. The inlet port 217 of the cylinder 214 leads to the chamber 198 of the brake housing 70, as shown in Fig. 21.

A slot 221 in the shuttle box floor 69 above the piston 218 guides a bracket 222 that is mounted on and slides with the piston 218. A permanent magnet 223 is held in the bracket 222 and a pad 224 of a material such as cork with a high coefficient of friction, is cemented on the magnet 223 to rise slightly above the bracket 222 and the floor of the shuttle box 81.

*The weft nip and clamp*

Referring now more particularly to Figs. 14, 15, 16 and 17 the weft nip and clamp support 71 has a post 225 at the right front from which a wall 226 runs rearwardly to the backbone 33. A second post 227 spaced from the post 225 is at the left front of the support 71 and an upper pivot shaft 228 and a lower pivot shaft 229 each extend between and are borne by the posts 225, 227. A pin 230 driven into the post 227 enters the lower shaft 229 to anchor it in place and a pin 231 passes through the post 227 and shaft 228 and extends rearwardly above the backbone 33. Pivotally mounted on the upper shaft 228 is a hub 232 with a gear 233 and from which extends an upper weft nip and clamp arm 234. Pivoted on the lower shaft 229 is a second hub 235 with a gear 236 in mesh with the gear 233 and from which extends a lower weft nip and clamp arm 237. The arms 234 and 237 pivot in unison between a closed position, shown in Fig. 17, that blocks the open end of the shuttle box 81 and an open position, shown in Fig. 16, that leaves the opening of the shuttle box 81 unrestricted. A cylinder 238 in the base of the weft clamp support 71 has a piston 239 with a shaft 240 extending through a cylinder cover 241 that is connected by a pin 242 to the lower nip and clamp arm 237. A spring 243 is inserted between the piston 239 and the cover 241 to urge the piston 239 downwardly.

To retain alignment of the clamp arms 234 and 237 a ridge 244 runs along the top of the lower clamp arm 237 and a complementary groove 245 is cut in the lower face of the upper clamp arm 234. A forked weft clamp 246 having a stem 247 is placed in a recess at the rearward end of the upper clamp arm 234 with a resilient cushion 248 sandwiched between the top of the clamp 246 and the arm 234. The stem 247 passes through the cushion 248 into the clamp arm 234 and a pin 249 in the arm 234 extends through a notch in the stem 247 to hold the clamp 246 in place while permitting limited upward travel with respect to the arm 234 that compresses the cushion 248. The lower clamp arm 237 has a short ridge 250 disposed to mate with the forked clamp 246 to provide for a seizing of weft thread upon the closing of the clamp arms 234 and 237. A blade 251 with a cutting edge 252 is secured to the upper clamp arm 234 to the outside of the forked clamp 246, as clearly shown in Fig. 20. A second blade 253 is secured on the lower clamp arm 237 with a cutting edge 254 disposed to pass closely by the edge 252 as the clamp arms 234, 237 are closed, as in Fig. 17. To complete the clamp arms 234, 237 a block 259 is secured as an integral portion on the end of the upper arm 234.

A rotatable shaft 255, shown clearly in Fig. 24, is mounted in the base of the right hand post 225 of the weft clamp support 71 and one end of a stiff wire 256 is inserted in the shaft 255. The wire 256 extends obliquely upwardly through a pivot block 257 that is free to pivot on the pin 242 and terminates in a crank shaped end 258 between the lower clamp arm 237 and the shuttle box 81. As the pin 242 and pivot block 257 are raised and lowered upon moving the clamp arms 234, 237 the wire 256 will sweep upwardly and then downwardly through an arc passing in front of the opening of the shuttle box 81.

As shown in Fig. 15, a valve chamber 260 in the weft nip and clamp support 71 has an inlet port 261 leading direct to line pressure and an outlet port 262 that extends into the cylinder 238. A cap 263 with a vent 264 closes the chamber 260 and a twin headed valve 265 disposed within the chamber 260 is adapted to alternately close the inlet 261 and the vent 264. A valve stem 266 extends through the cap 263 to the exterior.

A three armed lever 267 is pivoted beneath the nip and clamp support 71 with a first arm 268 pressed downwardly by a spring 269, as shown in Fig. 16, to move a second arm 270 upwardly against the valve stem 266. A third arm 271 extends downwardly and receives the inner end of the shaft 121 which has a collar 272 that may bear against the arm 271 to rotate the lever 267 upon the shaft 121 being displaced inwardly. A bell crank lever 273 pivoted at the front of the nip and clamp support 71 has a notched lower end 274 adapted to engage the finger 268 of the lever 267 and a bias spring 275, shown in Fig. 16, moves the lower lever end 274 against the lever 267. Referring now to Fig. 1, a weft clamp release 332 with a rearwardly extending arm 276 is mounted upon the breast beam 3 at the side of the woven cloth in position to be struck by the bell crank lever 273 as the lay 10 is moved to the beat line 7.

In Figs. 14 and 17 there is shown a block 277 mounted on the top of the inside end of the shuttle box cover 68. Pivotally attached to the rear face of the block 277 is a lever 278 that extends beyond the end of the cover 68 to be struck by the block 259 on the upper clamp arm 234, and which supports a rotatable disc 279 that is depressed into and retracted from the shuttle receiving box 81 as the lever 278 is pivoted downwardly and upwardly. A straight spring 280 with a fixed end fastened to the cover 68 has a deflected end pressing downwardly on the top of the lever 278, to move the lever 278 to a raised position lifting the disc 279 clear of the interior of the shuttle box 81.

*The shuttle and the apparatus at the left hand end of the lay*

In Fig. 18 there is shown a double headed shuttle 281 having a notch 282 at the right end of a configuration to be engaged by the catch 179 attached to the end of the brake cord 177 and a second notch 283 at the left end to be engaged by a similar catch in a shuttle controlling apparatus at the left hand end of the lay 10. The top face 284 of the shuttle 281 is grooved and a gripper arm 285 of a spring metal that extends for the length of the shuttle 281 is laid in the groove to form a channel 286 to the rear of the arm 285 and a second channel 287 to the front of the arm 285. A left end gripper finger 288 in the front channel 287 has a toothed jaw 289 that engages a similar jaw 290 that terminates the left end of the arm 285. A right end gripper finger 291 in the back channel 286 has a toothed jaw 292 that engages a mating jaw 293 terminating the right end of the arm 285. Both fingers 288 and 291 are formed of spring metal and the pairs of mating jaws are normally closed to clampingly engage weft thread when inserted therebetween.

In the base of the shuttle 281 is a plate 329 of magnetic material, shown in Fig. 11, adapted to be attracted by the homing magnet 223 and extending from the back face of the shuttle 281 is a pair of rollers 294, shown in phantom in Fig. 13, that serve to ride across the face of the reed 25.

The shuttle controlling apparatus that has been described is disposed at the right hand side of the lay 10 and to complete an operational loom a similar apparatus is disposed at the left hand side of the lay 10 together with a second weft supply. The left hand apparatus is, in the main, symmetrical to that described and has particular differences shown in Figs. 6 and 19.

In Fig. 6 the inner end of the shuttle receiving box of the left hand apparatus is shown with a feather 157′ that has a blade 158′ on the front side, rather than the back side as in the right hand unit of Fig. 14. A mounting block 277′ pivotally supports a lever 278′ with a disc 279′ disposed to the rear of the feather 157′, rather than to the front as in the right hand apparatus. The disc 279′ is disposed to open the jaws 292 and 293 at the right end of the shuttle 281, while the disc 279 of the right hand apparatus is disposed to open the jaws 289 and 290 at the left end of the shuttle 281, in a manner hereinafter described. The blade 158′ is disposed to be passed between the jaws 289 and 290 of the shuttle 281 and the blade 158 of the right end apparatus will pass between the shuttle jaws 292 and 293.

Referring now to Fig. 19, there is shown the ends of an upper weft nip and clamp arm 234′ and a lower weft nip and clamp arm 237′ of the left hand apparatus, as viewed from the shuttle box. A blade 251′ has a cutting edge 252′ spaced from the end of the upper arm 234′ and a blade 253′ has a cutting edge 254′ similarly spaced from the end of the lower arm 237′. This may be compared with the blades 251, 253 of the right hand apparatus shown in Fig. 20 in which the cutting edges 252 and 254 are at the ends of the blades.

*The electrical circuit*

Referring now to Fig. 22, the lay retraction cylinder 13 is connected to a valve 294 operated by a winding 295. Valve 294 vents the cylinder 13 upon energization of the winding 295 to permit the lay 10 to move toward the beat line 7, and feeds line pressure into the cylinder 13 upon a deenergization of the winding 295 to cause a retraction of the lay 10 to the dwell position. The cylinder 54 for the apparatus at the right hand end of the lay 10 is connected to a normally closed valve 296 which is opened upon energization of a winding 297. A corresponding air cylinder 54′ of the apparatus at the left hand end of the lay 10 has a valve 296′ and a winding 297′. The air cylinder 59 is fed through a valve 298 that is operated by a winding 299 and the corresponding air cylinder 59′ of the left hand apparatus has a valve 298′ that is controlled by a winding 299′.

The lay 10 is equipped with a set of normally closed push button switches 300 and a manual switch 301 having a contact arm that may be alternatively set in closed positions with either a contact 333 or a contact 334. A pair of power lines 302 and 303 are provided and one side of the winding 295 is joined through a lead 304 to the line 302. The opposite side of the winding 295 is joined through a lead 305 to the arm of the switch 301. Contact 333 of the switch 301 is joined to one side of the switches 300 and 301 which are connected in series, and the opposite side of the switches 300 and 301 is connected through a lead 306 and a lead 307 to the power line 303. Thus, with the switch 301 closing the contact 333 and upon opening either push button switch 300 the valve 294 is operated to lead line pressure into the cylinder 13 to move the piston 14 rearwardly and draw the lay 10 to its retracted dwell position. With the push button switches 300 both closed the winding 295 will be energized to vent the cylinder 13 and drop the lay 10 toward the beat line 7.

A shaft 308 rotated by the prime mover, not shown, of the loom 2 rotates a set of cams comprising a lay retraction cam 309, a weft clamp action cam 310, a right hand shuttle firing cam 311 and a left hand shuttle firing cam 312. The contact 334 of the switch 301 joins through a lead 313 with a switch 314 opened and closed in response to the rotation of the cam 309, and hence through the lead 307 with the power line 303. The winding 299 is connected through leads 315 and 316 in parallel with the winding 299' and one side of these windings 299, 299' is in turn connected through a lead 317 to the power line 302. The opposite side joins the power line 303 through a lead 318, a switch 319 operated by the cam 310 and lead 320. One side of winding 297 is joined by a lead 321 to the power line 303 and the opposite side of the winding 297 is joined through a lead 322, a switch 323 responsive to cam 311, and a lead 324 with the power line 302. In similar manner one side of winding 297' is joined through a lead 325 to the power line 302 and the opposite side is connected through a lead 326, a switch 327 responsive to cam 312 and a lead 328 to the power line 303.

For purposes of clarity, the ducts for the fluid pressure control system, embodied within the apparatus mounted upon the backbone 33, that extend between the cylinders and valve chambers shown and described have not, in general, been shown in the drawings. The connecting ducts joining the pressure operated elements are instead schematically illustrated in Fig. 21 wherein the complete pressure system is shown, exclusive of the cylinders 54 and 59 which do not comprise a part of the interconnected pressure operated elements mounted upon the backbone 33.

Referring now to Fig. 25, there is shown therein an apparatus similar to that of the previous Figs. 1–24 except that the fire and nip triggering elements are mounted directly upon the apparatus borne by the backbone, rather than on the lay bottom as illustrated in the previous figures. Parts in Fig. 25 identical to those of the previous figures have been designated with like reference numerals. Mounted on the shuttle box cover 68 of the apparatus in Fig. 25 is a cylinder and valve housing block 335 above which a solenoid 336 is held by a bracket 337. As shown more clearly in Fig. 26 a plunger 338 of the solenoid 336 rests upon a valve stem 339 of a valve 340. The valve 340 fits within an opening 341 in the block 335, and the solenoid plunger 338 is biased by a spring 350 to normally hold the valve 340 closed against an inlet port 342 connected to a pressure source. An outlet port 343 is in the side of the opening 341 and a cap 344 through which the valve stem 339 extends closes the top of the opening 341 and has a vent 345. A cylinder 346 opens upon the left hand face of the block 335 and receives a piston 347 with a short shaft 348 that bears against a lever 349. The lever 349 is similar to the lever 118 of the apparatus of Figs. 1–24, with the lower portion beneath the pivot pin 119 cut off. A ball 351 closes the side of the port 343 opening upon the cylinder 346 and a spring 352 is interposed between the ball 351 and piston 347.

Referring again to Fig. 25, a bracket 353 depends from the weft clamp support 71 and supports a solenoid 354 with a plunger 355. The plunger 355 extends to the left to engage the lower arm 271 of the lever 267 and upon energization of the solenoid 354 the plunger 355 moves the lever 267 clockwise.

Operation

To ready the apparatus of the invention for weaving the bracket 31 that supports the backbone 33 is shifted along the dovetail track 29 to bring the inside end of the assembly mounted on the backbone 33 up to the outermost warp 5, to reduce the gap between the shed and the entrance to the shuttle box 81 to a minimum. The mounting screws 30 securing the track 29 in the mounting plate 28 are then brought up tight to clampingly engage the bracket 31 between the flanged mounting member 28 and the beveled faces of the track 29. For alignment of the shuttle box 81 with the open shed and the reed 25 the assembly on the backbone 33 may be shifted by loosening the bolts 32 in the front face of the bracket 31 and moving the backbone 33 upwardly or downwardly and then retightening the bolts 32. For the apparatus of Figs. 1–24 the connector 123 is now secured to the fire control rod 41.

Similarly the shuttle control apparatus at the left hand end of the lay 10 is positioned for operation. The following description of operation is directed to the form of the apparatus shown in Figs. 1–24. Like parts of the apparatus of Figs. 25, 26 operate in similar manner and hereinafter particular reference is made to the operation of the form of the apparatus shown in Figs. 25, 26.

A weft thread 331 is drawn off the weft supply spool 22 and the end is inserted through the eye 146 atop the valve housing 63. The thread 331 is then led between the plates 147 and 148, the upward pressure of the lower plate 148 being regulated by adjustment of the set screw 153 to tension the weft 331 as desired, and passed through the tubular guide 155.

From the guide 155 the end of the weft 331 is inserted in the opening 161 in the blade 158 and drawn a short distance from the emerging end of the opening 161 at the opening of the shuttle box 81. Similarly, the apparatus at the left hand end of the lay 10 has a weft 330 fed into the apparatus.

Upon energization of the prime mover for the loom, which is not shown, the cam shaft 308 is set into continuous rotation. To reciprocate the lay 10 for weaving the switch 301, shown in Fig. 22, is moved to close the switch arm with the contact 334, to join leads 305 and 313. The winding 295 will be energized twice for each revolution of the shaft 308 in response to closure of the switch 314 by the double lobe cam 309. As hereinbefore described, energization of winding 295 causes valve 294 to vent the cylinder 13 to allow the lay 10 to move downwardly and forwardly to the beat line 7. Upon deenergization of winding 295 valve 294 will feed line pressure into the cylinder 13 and the lay 10 will retract to the dwell position.

The switch 319 is also closed twice for each revolution of the shaft 308 and upon closure the windings 299 and 299' are energized to operate the valves 298 and 298', which then feed line pressure to the air cylinders 59 and 59'. The cylinders 59 and 59' have pistons that are actuated to move the cam plates 60 and 60' inwardly to intersect the path of travel of the rollers 57 and 57' respectively that translate the fire control rods 41 and 41' upon riding across the cam plates 60, 60' to actuate the weft clamp arms. The lobes of the cam 310 are positioned to cause operation of the cam plates 60 and 60' to occur during the downswing of the lay 10 toward the beat line 7. The cams 311 and 312 each have a single lobe such that switches 323 and 327 are closed alternatively when the lay 10 is at or moving in the vicinity of the retracted dwell position. Upon closure of the switch 323 the winding 297 is energized to operate the valve 296 which connects the cylinder 54 with line pressure to move cam 51 upwardly into the path of the roller 50. Upon the next reciprocation of the lay 10 toward the dwell the switch 327 will be closed to energize the winding 297′ that operates valve 396′ to feed line pressure to cylinder 54′ that moves cam 51′ into the path of travel of the roller 50′.

If it is desired to stop continuous lay motion, while the prime mover and shaft 308 are in operation, the contact arm of the switch 301 may be moved to open contact 334 and close contact 333. The push button switches each being closed complete a circuit to energize the winding 295 and vent the cylinder 13. The lay 10 will then be moved to the beat line 7, at which position it will remain unless either switch 300 is opened. An opening of a switch 300 will effect deenergization of the winding 295 to cause valve 294 to feed line pressure to the cylinder 13. The lay 10 will then be moved to the retracted dwell position.

*Receipt of shuttle*

The cycle of operation for a shuttle controlling apparatus on the lay 10 will be described by reference to the right hand apparatus and will commence with the shuttle 281 traveling through the shed toward the right hand shuttle receiving box 81. The shuttle 281 will have a weft 330 held in the gripper jaws 289 and 290 at its left or trailing end, the feather 157 will be raised, and the upper and lower clamp arms 234, 237 will be open to permit unobstructed entry of the shuttle 281.

As the shuttle 281 enters the receiving box 81 the notch 282 at the right or leading end will engage and pick up the shuttle catch 179 that protrudes into the shuttle box 81 and is secured to the brake cord 177. The initial position of the brake elements will have the cord 177 wrapped about the flange 176 of the rotatable brake disc 171 with the catch 179 adjacent the notch 35 in the backbone 33. The brake discs 171 and 199 are initially engaged and the pressure therebetween may be regulated by adjustment of the cap 204 threadedly held on the shaft 164. The cap 204 controls the compression of the spring 203, which provides necessary brake pressure. Also for the initial position the reset cord 209 is unwound from the pulley 174 and the piston 212 and pulley 208 are extended. The shuttle 281 will draw the cord 177 off the flange 176, as it advances into the box 81, thus rotating the brake disc 171 and being brought to a halt. Rotation of the disc 171 will wind the reset cord 209 about the pulley 174, drawing the piston 212 into its cylinder 211, as shown in Fig. 14, and the cam 175 will be rotated to engage the roller 181 and move the pin 180 to the right, as shown in Fig. 15. The hinge lever 183 is then swung to the right against the bias of spring 189 and the valve 195 is free to move away from the inlet port 193, which it normally closes, in response to line pressure.

Movement of the valve 195 to the right closes the vent opening 192 and line pressure will pass from the inlet port 193 through the outlet port 194 into the chamber 198 to urge the cup 163 upwardly against the spring 166. Upward movement of the cup 163 brings the shoulder 165 of the shaft 164 against the bell housing 201 of the vertically movable brake member 199 and raises the member 199 to disengage the brake lining 200 from the rotatable brake disc 171.

With the brake members 171, 199 released the shuttle 281 is free of restraint and may be moved into engagement with the resilient nose piece 84 of the shuttle ejecting ram 75 for optimum throw from the shuttle box 81. This position is shown in Fig. 11. This continuation of the terminal travel of the shuttle 281 after braking for retracting the shuttle 281 fully within the box 81 is termed "homing." Homing is accomplished by movement of the magnet 223 beneath the magnetic plate within the shuttle 281, in the manner as follows.

Line pressure, having been applied to within the chamber 198 that is formed between the bottom of the cup 163 and the bowl 162 at the bottom of the brake housing 70, will extend, as shown in Fig. 21, through the port 217 into the cylinder 214. The initial position of the piston 218 and the magnet 223 is to the left, having been moved thereto by the line pressure that is present in the tubular rod 219. With the entry of line pressure into the cylinder 214 the force on the left face of piston 218 becomes greater than that on the right, with consequent movement to the position shown in Fig. 11. Magnetic attraction will then carry the shuttle 281 into home position, and the weft 330 held in the gripper jaws 289, 290 and extending through the shed wil be stretched by the homing movement. The magnetic attraction is sufficient to retain the shuttle 281 in home position against the force exerted by the reset piston 212, transmitted to the shuttle through cords 209 and 177, and the tension set up in the weft 330.

*Release of weft from shuttle and the beat motion*

As the lay falls from the dwell position toward the beat line 7 switch 319 wil be closed to energize the windings 299 and 299′, as hereinbefore noted, and cam plates 60 and 60′ are then moved inwardly. The rollers 57 and 57′ will ride over the cams 60 and 60′ as the lay descends to cause the fire control rods 41 and 41′ to be actuated inwardly. Referring now primarily to Fig. 15, it will be observed that movement of the rod 41 inwardly moves the shaft 121 through the connector 123 in like direction. Collar 272 on shaft 121 moves arm 271 of the lever 267 clockwise to raise the arm 268 which is then held raised by engaging the notch of the lever 273, as shown in Fig. 16. The lever arm 270 is pivoted downwardly away from the valve stem 266. The valve 265 will drop in response to line pressure at the inlet port 261 and close the vent 264. Line pressure is now fed from the inlet port 261 through outlet port 262 into the cylinder 238 shown in Figs. 16 and 17. Piston 239 is moved upwardly against the spring 243 to rotate the lower clamp arm 237 upwardly and the upper clamp arm 234 downwardly, into closed position. As shown in Fig. 20, the weft 330 held in the shuttle 281 is disposed to the side of the cutting edges 252, 254 and will be held between the forked clamp 246 and the ridge 250 as the clamp arms 234, 237 are brought together.

The downward movement of the upper clamp are 234 brings the block 259 at the end of the arm downwardly upon the lever 278 that mounts the disc 279, as is clearly shown in Fig. 17. The lever 278 is lowered against the bias of the spring 280 and the disc 279 is inserted between the central gripper arm 285 and the gripper finger 288, as shown in Fig. 20, to spread the jaws 289 and 290 that hold the weft 330. Simultaneously, with the upward swing of the lower clamp arm 237, the stiff wire 256 is swung rapidly upwardly to knock the weft 330 out of the shuttle jaws 289 and 290.

The upper and lower clamp arms 234′ and 237′ of the left hand shuttle control assembly, shown in Fig. 19, close similarly as the clamp arms 234 and 237. The weft 330, which has been drawn from a spool at the left side of the loom 2, is disposed between the cutting edges 252′ and 254′ to be severed upon closure of the arms 234′ and 237′. This end of the weft 330 is also grasped between a forked clamp 248′ and its associated ridge 250′ to hold the weft 330 in position as the lay 10 is beat up to the apex of the shed of warp threads 5.

As the forwardly moving lay 10 approaches the beat line 7 the upper end of the bell crank lever 273, clearly shown in Figs. 14 and 16, strikes the arm 277 of the nipper release 276, shown mounted on the breast beam 3 in Fig. 1. Lever 273 is moved against the spring 275 and the lower end 274 is swung forwardly to disengage the arm 268 of the lever 267. Lever 267 is then moved by the spring 269, shown in Fig. 16, to cause the lever arm 270 to move the valve stem 266 upwardly. The inlet port 261 is closed by the upward movement of valve 265 and cylinder 238 is vented through the vent passage 264. The spring 243 moves piston 239 downwardly to again open the clamp arms 234 and 237 to the position shown in Fig. 16. As the upper arm 234 is swung to open position the block 259 no longer retains the lever 278 in down position and the disc 279 will be retracted from between the shuttle gripper arm 285 and gripper finger 288.

Release of the weft 330 from the clamp arms at the right and left ends of the lay permits the lay 10 to be retracted to the dwell upon the beating of the weft into place in the cloth. As the lay 10 is retracted the heddles 6 will be operated to shift the warp threads 5 in conventional manner, which operation closes and then reopens the shed to permit the passage of the shuttle 281.

Throwing the shuttle and resetting the throwing elements

As the lay 10 is now retracted from the beat line 7 the rotary cam 311 will close the switch 323 to energize the winding 297 and cause the cam 51 to rise as hereinbefore described. The roller 50 will pass over the cam 51 and move the fire control rod 41 outwardly to the right as viewed in Fig. 3. The shaft 121 is moved by the connector 123 with the rod 41 to rotate the lever 118 and its depending extension 120 in a counterclockwise direction. The shaft 119, which is keyed to the lever 118, is likewise rotated and the feather 157 riding on shaft 119 is depressed to the position shown in Figs. 11 and 23, in which the blade 158 is inserted in the channel 286 of the shuttle 281. The end of the weft 331 then extends just to the front of the shuttle 281.

Rotation of the lever 118 also moves the strut 117 that is secured to the firing latch 113, as shown in Fig. 10. The latch finger 116 of the latch 113 is raised in response to the pull of the strut 117 to permit the shuttle throwing ram 75 to be moved inwardly to enter the shuttle box 81. With the throwing ram 75 retracted and held by the latch 113, as shown in Figs. 10 and 23, the piston 91 of the firing motor cylinder 62 and the sheave block 95 are to the left as is shown in phantom, in Fig. 7. Line pressure in the large chamber 94 of the cylinder 62 urges the piston 91 toward the right to the position shown in Fig. 7. Movement to the right is however restrained by the firing cord 111 which is secured to the head 79 of the throwing ram 75. Upon raising the latch finger 116 of latch 113 above the ram head 79, the ram 75 is released and the piston 91 and sheave block 95 are no longer restrained from movement. Upon such release the sheave block 95 is rapidly separated from the stationary sheaves 108 and 109 to draw in the firing cord 111 and propel the throwing ram 75 against the shuttle 281. The shuttle is quickly accelerated and thrown from the box 81 through the shed toward the opposite end of the lay 10.

As the shuttle 281 departs from the box 81 the blade 158 in the shuttle channel 286 will deflect the gripper finger 291 to open the jaws 292 and 293. As the jaws 292 and 293 are moved past the blade 158 they will again close and pick up the end of the weft 331. The weft 331 is then drawn from the weft supply spool 22 at the right hand side of the loom 2 as the shuttle passes in its flight through the shed.

The shuttle 281 will be received, braked and homed by the similar apparatus at the left end of the lay 10. Upon homing at the left hand end slack in the weft 331 laid in the shed will be taken up, the tension plates 147, 148 having sufficient pressure to cause the weft 331 to be slightly tensioned before additional weft is drawn off the spool 22.

For firing movement of the piston 91 the valve 97 is held closed by the line pressure within the chamber 94. The valve 105 is open and the vents 103 leading to the atmosphere are of size sufficient to pass the air within the cylinder 62 on the right hand side of the piston 91 to ensure that a pressure will not built up with piston displacement to decrease the velocity of the stroke. Piston excursion is arrested by striking the resilient block 106 and moving the valve 105 to the closed position shown in Fig. 7.

The shuttle throwing ram 75 is decelerated upon the head 79 striking the semi-circular collars 89 of the arresting pistons 88 and moving the pistons 88 inwardly in the cylinders 86 against line pressure. The snubbing action of the pistons 88 may be enhanced by restricting the ports 87 to trap the air within the cylinders 86 and effect an increase in pressure as the pistons 88 are moved inwardly. In this manner deceleration of ram 75 may take place over a small distance.

In Fig. 10 the elements in the block 63 are shown in the position assumed when the ram 75 is held by the latch 113. The bushing 137 bears against the spring seat 138, which in turn compresses the spring 142. Spring pressure is exerted through spring seat 140 and stem 139 to pivot the lever 143 against the valve stem 134. Valve 133 is thus held against the inlet port 129.

Now referring to Fig. 12, wherein the ram 75 has been moved away from the latch 113, the bushing 137 is to the left and the spring seat 138 is abutting the head of the stem 139, having been moved by an expansion of the spring 142 that took place upon the ejector ram 75 being thrown from the position of Fig. 10. The stem 139 together with the spring seats 138, 140 and spring 142 may slide to the left as a unit and the spring force that had been exerted against the lever 143 when the ram 75 was retracted as in Fig. 10 vanishes. The valve 133 is then moved to the right by line pressure to the position shown in Fig. 12. The vent 132 is now closed and line pressure feeds from port 129 through the channel 130 into the quill 72 and hence through the quill opening 74 into the chamber 78. Pressure builds up in the chamber 78 to exert a force upon the bushing 77 at the right end of the ram 75 that will urge the ram 75 to the retracted position of Figs. 10 and 11. Line pressure from the inlet port 129 will also feed through the outlet port 131 to the inlet port 102, shown in Fig. 7, in the right hand end of the motor cylinder 62. The connections are schematically shown in Fig. 21. Pressure will now also build up on the right hand side of the piston 91, valves 105 and 97 being closed. Pressures on both sides of piston 91 will become equal and the valve 97 supported on the spring arm 98 will open. The area of the right hand face of the piston 91 exceeds that of the left hand face and the net force, pressures being equal, will return the piston 91 to the position shown in phantom in Fig. 7. The firing cord 111 may now be drawn from the sheaves by the ejector ram 75, with a resulting simultaneous reset of the piston 91 and ram 75 for the next cycle of operation.

Resetting of the piston 91 brings the cushion block 99 on the valve 97 into engagement with the plate 100 to reclose the valve 97, and return of the ram 75 will move the bushing 137 and the spring seat 138 to the posittion shown in Fig. 10. Resulting compression of the spring 142 moves the stem 139 to the right and rotates the lever 143 against the valve stem 134. The valve 133 is moved to close the inlet port 129 and open the vent 132 to exhaust the chamber 78 in the ejector ram 75 and the right hand side of the firing motor cylinder 62. With a fall in pressure in the right side of the cylinder 62 the spring 107 will reopen the valve 105, permitting a further exhaust and the firing shuttle throwing elements of the apparatus are now reset for the next cycle of operation.

Resetting the brake and homing elements

Upon throw of the shuttle 281 from the box 81 the restraint on the reset piston 212, shown in Fig. 14, is removed. The piston 212 will move to shift the pulley 208 outwardly from the brake housing 70 and the reset cord 209 will be drawn from the pulley 174 to rotate the brake disc 171. Rotation of disc 171 will wind the brake cord 177 about the flange 176 to draw the catch 179 toward the notch 35 in the backbone 33, and the lobe portion of the cam 175 will be turned from the small wheel 181. Pin 180 may then be moved to the left, as shown in Fig. 15, in response to the bias spring 189 and the lever 183, also moved by the spring 189, will act against the valve stem 196 to close the inlet port 193 and open the vent 192.

The rate of exhaust of the chamber 198 and the cylinder 214 may be controlled by the valve 197. As the pressure drops in the cylinder 214 the piston 218 is moved to the left by the line pressure in the tubular rod 219. The movement of piston 218 and the proper adjustment of the valve 197 will retain a substantial pressure in the cylinder 214 and also in the chamber 198 to maintain the cup 163 raised. Hence, the brake discs 171 and 199 are retained in open position. With the brake open the rotation of the disc 171 may continue to fully rewind the cord 177.

Upon the piston 218 being returned to its left hand position the magnet 223 is likewise readied for the receipt of the shuttle in the subsequent cycle of operation. Pressure in the chamber 198 will now decrease permitting the spring 166 to move the cup 163 downwardly to lower the vertically movable brake member 199 and engage the brake lining 200 with the brake disc 171.

*Severing and holding the weft for the beat of the lay*

The shuttle having been thrown to and received by the apparatus at the left hand end of the lay 10, while the lay 10 was near the dwell position, and the lay 10 again being swung forward to the beat line 7, the rotary cam 310 will close the switch 319 to energize winding 298 and move cam plate 60 once again into the path of the roller 57. Roller 57 will strike and pass over the cam 60 to move the fire control rod 41 outwardly to cause closure of the clamp arms 234 and 237 in the manner hereinbefore described.

Referring now to Fig. 20, there is shown in phantom the weft 331 that is supplied from the weft supply spool 22 at the right side of the loom 2 and that is carried by the shuttle 281 as it is thrown from the right to the left hand side of the lay 10. As the clamp arms 234 and 237 close the weft 331 will be severed by the cutting edges 252 and 254 to free the portion of weft laid in the shed from the weft supply. The cut end will be struck by the upwardly moving wire 256 to be deflected clear of the shuttle box 81. Referring now to Fig. 19, the weft 331 lays rearwardly of the cutting edges 252' and 254'. The weft 331 will be grasped by each set of clamp arms as the lay 10 advances to the beat line 7 and will be released similarly as the weft 330 had been released in the first beat of the lay in the cycle of operation. Upon the lay being again retracted to the dwell the shuttle will be thrown to the right and the cycle of operation that has been described will be repeated.

The apparatus of Figs. 25 and 26 has the electro-magnetic triggering elements for firing and closing the weft clamp arms 234, 237 mounted directly upon the elements secured to the backbone 33. In this manner each may be operated by closing a circuit for the respective solenoid magnet 336 or 354 and lay position need not be determinative of the time of firing or weft clamp closure.

Energization of solenoid 336 moves plunger 338 upwardly and pressure in the inlet port 342 will move valve 340 upwardly. Line pressure will flow through port 343 and move piston 347 and shaft 348 against the lever 349 to lift the latch 113 and lower the blade 157 similarly as when the lever 118 of the apparatus of Figs. 1–24 is moved clockwise. The ball 351 obstructs rapid venting of the cylinder 346 to prolong the duration of stroke of the piston 347. Small grooves, not shown, alongside the ball 351 permit air to escape from the cylinder 346, upon the solenoid 336 being deenergized and the valve 340 returned to lower position, and this escape is completed by passing through the vent 345.

Energization of solenoid 354 will move plunger 355 against lever arm 271 and the weft clamp elements will operate similarly as in the apparatus of Figs. 1–24. Closure of the circuits for solenoids 336, 354 may be controlled by switches responsive to functions other than lay position and manual switches may be employed to cause throw of the shuttle or closure of the weft clamp arms 234, 237 whether the lay is in motion or at rest.

There is provided through the use of this invention an apparatus for weaving that will not require frequent shut-down of the loom for replenishing the weft supply. The weft may be supplied in large quantities to the sides of the loom and the woven cloth will have a uniform texture not readily obtainable with the pirn type shuttle.

The shuttle employed may be of low inertia and reduced dimension. The shuttle inertia being constant, the braking elements of this invention uniformly decelerate the shuttle at the end of each flight and bring it to a halt within a range of position considerably less than would be possible for a pirn type shuttle. By providing a homing movement after the shuttle is braked the slack of weft is taken up and the shuttle is moved into optimum position for throw without imparting unwanted impacts to the throwing apparatus.

The magnetic homing employed permits relative movement of the homing magnet and the shuttle. Shuttle position after braking will vary and with the magnetic attraction of this invention the homing magnet may be given a greater travel than the maximum distance the shuttle need be moved for engagement with the throwing ram. Homing will be uniform and the obstruction presented to the shuttle by the homing elements is a minimum.

I claim:
1. In a shuttle control for a loom the combination comprising a shuttle box, a shuttle brake having a first brake member and a second brake member frictionally engageable and disengageable with respect to said first brake member adapted to slip with respect to the first brake member when engaged therewith to develop braking friction and cooperatively engageable with a shuttle entering said box to impart braking drag thereto, brake disengaging means responsive to relative position of said braking members, and shuttle homing means having a member movable along said box to move a shuttle therein after braking of the shuttle.

2. In a shuttle control for a loom having a lay the combination comprising a shuttle box, shuttle throwing means having a resilient shuttle engaging nose, a firing motor cooperatively engaged with said shuttle throwing means adapted to impel said throwing means in shuttle throwing movement, firing motor triggering means for setting said firing motor into firing movement for a predetermined position of the lay, weft clamping jaws having a cylinder and piston cooperatively engaged with said jaws to open and close the same, and weft clamping jaw operating means including valve means for joining said cylinder to a pressure source and venting the same for predetermined positions of the lay.

3. In a shuttle control for a loom the combination comprising a shuttle box, a shuttle brake having a set of relatively movable braking members frictionally engageable with one another to develop braking drag one of which is engageable with a shuttle entering said box to impart braking drag thereto, brake release means cooperative with said brake to disengage one brake member from the other after braking of a shuttle, brake return means connected with the brake member engageable with a shuttle, which return means is adapted during disengagement of the brake members to return such brake member to the position assumed before braking, shuttle throwing means having a shuttle engaging nose, and a firing motor cooperatively engaged with said shuttle throwing means adapted to impel said throwing means in shuttle throwing movement.

4. In a shuttle control for a loom having a lay the combination comprising a shuttle box on said lay having a shuttle entrance, a shuttle brake having a set of relatively movable frictionally engaged braking members cooperatively engageable with a shuttle entering said box to impart braking drag thereto, brake disengaging means responsive to relative position of said braking members, shuttle homing means having a member movable along said box to move a shuttle therein after braking of the shuttle, a set of weft clamping jaws adapted to close and reopen stationed at the front of said shuttle entrance to move with the shuttle box as said lay is reciprocated, and weft clamping jaw operating means adapted to close and open the jaws for predetermined positions of the lay.

5. In a shuttle control for a loom having a lay the combination comprising a shuttle box, a shuttle brake having a set of braking members relatively movable with one another to provide braking drag, brake disengaging means including a cylinder and piston and valve means for the cylinder responsive to relative position of said braking members, shuttle homing means including a cylinder and a piston fed through said valve means having a member movable with said piston in magnetic attraction with a shuttle in said shuttle box to continue travel of the shuttle after braking, weft clamping jaws having a cylinder and piston cooperatively engaged with said jaws to open and close the same, weft clamping jaw operating means including valve means for joining said cylinder to a pressure source and venting the same for predetermined positions of the lay, shuttle throwing means having a resilient shuttle engaging nose, a pressure operated firing motor cooperatively engaged with said shuttle throwing means adapted to impel the same in shuttle throwing movement, and firing motor triggering means adapted to cause said motor to impel said shuttle throwing means for predetermined position of the lay.

6. In a shuttle control for a loom the combination comprising a shuttle box member having a recess to receive a shuttle, a brake having a pair of braking members engageable with one another and relatively movable to one another with sliding friction to provide braking drag, shuttle engaging means cooperatively engaged with one of said braking members adapted to be moved by a shuttle entering said recess to move one brake member from a normal position relative to the other and transmit braking drag to said shuttle, brake release means cooperative with said brake to disengage one brake member from the other after braking of a shuttle, and brake return means adapted during disengagement of the brake members to return said braking member engaged with said shuttle engaging means to normal position.

7. In a shuttle control for a loom the combination comprising a shuttle box member having a recess to receive a shuttle, a brake having a pair of braking members relatively displaceable to one another between engaged and released positions and relatively movable against one another when engaged to provide braking friction, shuttle engaging means cooperatively engaged with one of said braking members adapted to be moved by a shuttle entering said recess to move one brake member relative to the other and transmit resultant braking friction to said shuttle, brake opening and closing means adapted to relatively displace said braking members from engaged to released position upon substantial braking of the shuttle and from released to engaged position upon removal of the shuttle from said recess.

8. In a shuttle control for a loom the combination comprising a shuttle box member having a recess to receive a shuttle, a brake having first and second braking members relatively displaceable with one another between engaged and disengaged positions and relatively movable against one another when engaged to provide braking friction, shuttle engaging means cooperatively engaged with the first of said braking members adapted to be moved by a shuttle entering said recess to move the first brake member relative to the other from a normal to an operated position and to transmit resultant braking friction to said shuttle, bias means urging said first braking member toward normal position, brake opening and closing means adapted to relatively displace said braking members between said engaged and disengaged positions whereby said braking members are relatively displaced to released position when the shuttle engaging means is moved by a shuttle to move the first braking member to operated position and whereby said braking members are returned to engaged position after said first braking member is returned to normal position by said bias means.

9. In a shuttle control for a loom the combination comprising a shuttle box member having a recess to receive a shuttle, a rotary brake having a pair of braking members one of which is rotatable with respect to the other from a normal position to provide braking friction, a shuttle engaging member cooperatively engaged with said rotatable braking member engageable with a shuttle entering said recess and moved thereby to turn the rotatable braking member from said normal position, and biasing means cooperatively engaged with said rotatable braking member to urge the same toward said normal position when rotated therefrom.

10. In a shuttle control for a loom the combination composing a shuttle box member having a recess to receive a shuttle, a rotary brake having an axis with a pair of braking members axially displaceable between engaged and disengaged positions, one of which is rotatable with respect to the other from a normal position to provide braking friction, a shuttle engaging member cooperatively engaged with said rotatable braking member adapted to be engaged by a shuttle entering said recess and moved thereby to rotate the rotatable braking member from said normal position, brake bias means urging said braking members axially into engaged position, a cylinder having a movable piston member cooperatively engaged with said brake adapted to axially move said brake members toward disengaged position against said brake bias means, and inlet and outlet passages for said cylinder including valve means cooperatively engaged with said rotatable braking member to be actuated upon rotation of said brake member a predetermined distance from said normal position.

11. In a shuttle control for a loom the combination comprising a shuttle box member having a recess to receive a shuttle, a rotary brake having an axis with a pair of braking members axially displaceable between engaged and disengaged positions, one of which is rotatable with respect to the other from a normal position to provide braking friction, a shuttle engaging member cooperatively engaged with said rotatable braking member adapted to be engaged by a shuttle entering said recess and moved thereby to rotate the rotatable braking member from said normal position, said shuttle engaging member being retained by a shuttle when in said chamber in position to retain said rotatable braking member in rotated position, biasing means cooperatively engaged with said rotatable braking member to urge the same toward said normal position when rotated therefrom, brake bias means urging said braking members axially into engaged position, a cylinder having a movable piston member cooperatively engaged with said brake adapted to move said brake members toward disengaged position against said brake bias means, and inlet and outlet passages for said cylinder including valve means cooperatively engaged with said rotatable braking member to be actuated thereby upon rotation of said brake member a predetermined distance from said normal position, actuation of said valve means causing said piston to move said brake members toward disengaged position.

12. In a shuttle control for a loom the combination comprising shuttle box means adapted to receive a shuttle, shuttle braking means having a pair of relatively movable braking members one of which is adapted to be cooperatively engaged with a shuttle being received by said shuttle box means to apply braking force thereto and having a released position permitting movement of said shuttle while engaged with a braking member without imparting braking force thereto, and brake releasing means responsive to position of said braking member adapted to be cooperatively engaged with a shuttle to shift said braking means to said released position upon movement of said braking member to a predetermined position and adapted to return said braking means from said released position upon movement of said braking member adapted to be cooperatively engaged with a shuttle from said predetermined position.

13. In a shuttle control for a loom the combination comprising a shuttle box member for receiving a shuttle, a shuttle brake having braking members relatively displaceable between engaged and disengaged positions, a first cylinder having a piston movable within said cylinder cooperatively engaged with one of said braking members to displace the same relative to the other, an inlet for said cylinder for connection to a pressure source having a medium under pressure, a second cylinder having a piston, a duct connecting said first cylinder with said second cylinder, and biasing means to urge said piston of said second cylinder toward the entrance of said duct into said second cylinder.

14. In a shuttle control for a loom the combination comprising a shuttle box member for receiving a shuttle, a shuttle brake having braking members relatively displaceable between engaged and disengaged positions and relatively movable from a normal position when engaged against one another for braking drag, a first cylinder having a piston movable within said cylinder cooperatively engaged with one of said braking members to displace the same relative to the other from engaged to disengaged position, an inlet for said cylinder for connection to a pressure source having a medium under pressure, inlet valve means movable between alternative positions to connect said cylinder to a pressure source or to vent the cylinder, valve controlling means responsive to relative movement of said braking members adapted to move said valve to one of said positions upon a substantial relative movement of said braking members from said normal position and to move said valve to the other of said positions upon return of said braking members to said normal position, a second cylinder having a piston and an inlet toward one end leading from said first cylinder, and biasing means urging said piston of said second cylinder toward said inlet of said second cylinder.

15. In a shuttle control for a loom the combination comprising a shuttle box member for receiving a shuttle, a shuttle brake having braking members relatively displaceable between engaged and disengaged positions, a first cylinder having a piston movable within said cylinder cooperatively engaged with one of said braking members to displace the same relative to the other, an inlet for said cylinder for connection to a pressure source having a medium under pressure, a second cylinder having a piston with a large area face and a small area face, a first inlet for said second cylinder joining the portion of said second cylinder on the side of the large area face of said piston to said first cylinder, and a second inlet for said second cylinder adapted to join the portion of said second cylinder on the side of the small area face of said piston to the pressure source.

16. In a shuttle control for a loom the combination comprising a shuttle box member having a recess to receive a shuttle, first and second braking members relatively displaceable between engaged and disengaged positions and relatively movable with one another when engaged to provide braking drag, shuttle engaging means cooperatively engaged with the first of said braking members adapted to be moved by a shuttle entering said recess to move the first brake member from a normal position relative to the other and transmit braking drag to said shuttle, brake return means adapted to return said first braking member to normal position, a first cylinder having a piston movable within said cylinder cooperatively engaged with one of said braking members to displace the same from engaged to disengaged position, an inlet for said cylinder for connection to a pressure source having a medium under pressure, a second cylinder having a piston, a duct extending between and opening into said first cylinder and said second cylinder, biasing means urging said piston of said second cylinder toward the opening of said duct into said second cylinder, and an inlet including valve means for said first cylinder responsive to movement of said first braking member adapted to cause said piston of said first cylinder to move to disengage said braking members upon movement of said first brake member from normal position.

17. In a shuttle control for a loom the combination comprising a shuttle box having a lengthwise recess to receive a shuttle, a shuttle adapted to be received by said box, a shuttle homing member mounted for guided movement lengthwise of said shuttle box, said shuttle and said homing member including a magnet and a body of magnetic material whereby the magnetic field of said magnet is conducted through said magnetic material upon said shuttle being received by said box to magnetically link said shuttle and homing member, and actuating means for said homing member adapted to move the same with respect to said box whereby movement of said shuttle with said homing member will occur through said magnetic linkage.

18. In a shuttle control for a loom the combination comprising a shuttle box having a recess adapted to receive a shuttle, a shuttle comprising magnetic material adapted to be received within said box, a shuttle homing member including a magnet disposed to one side of and movable along said recess, and actuating means for said homing member to move the same along said recess.

19. In a shuttle control for a loom the combination comprising a shuttle box adapted to receive a shuttle, a cylinder having a reciprocably movable piston therein, biasing means to urge said piston toward one end of said cylinder, a shuttle homing member cooperatively engaged with said piston movable along the shuttle box, inlet connections for said cylinder adapted to be joined to a pressure source, and valve means for said inlet connections responsive to shuttle motion within said box.

20. In a shuttle control for a loom the combination comprising a shuttle receiving box, a shuttle adapted to be received by said box, a shuttle homing member movable along said box, said shuttle and said homing member including a magnet and a body of magnetic material whereby the magnetic field of said magnet is conducted through said magnetic material upon said shuttle being received by said box, a cylinder having a reciprocably movable piston cooperatively engaged with said homing member adapted to move said homing member along said box, biasing means to urge said piston toward one end of said cylinder, inlet connections for said cylinder adapted to be joined to a pressure source, and valve means for said inlet connections responsive to shuttle motion within said box.

21. In a shuttle control for a loom the combination comprising a shuttle receiving box, a cylinder having a piston reciprocably movable therein dividing said cylinder into first and second chambers with a large area face enclosing said first chamber and a small area face enclosing said second chamber, a shuttle homing member movable along said box cooperatively engaged with said piston to be moved thereby, first inlet connections for said cylinder adapted to be joined to a pressure source entering said second chamber, a shuttle brake having braking members movable between engaged and disengaged positions, a brake cylinder having a piston movable therein cooperatively engaged with one of said braking members to move the same relative to the other, an inlet connection for said brake cylinder for connection to a pressure source, valve means for said brake cylinder inlet connection movable between alternative positions connecting said inlet connection to a pressure source and to vent said brake cylinder, a valve control responsive to shuttle movement within said boxing member adapted to move said valve means to one of said positions upon a shuttle advancing within said box and to move said valve means to the other of said positions upon movement of a shuttle from said box, and duct connections joining said braking cylinder to the said first chamber of said cylinder.

22. In a shuttle control for a loom the combination comprising a shuttle receiving box, a shuttle throwing member including a hollow cylindrical sleeve mounted for reciprocable axial movement between a retracted position and a fired position and a shuttle ejecting portion at one end of said sleeve adapted to engage a shuttle within said box and impel the same from the box upon movement of said sleeve toward fired position, a tubular stem extending within said sleeve from the end opposite the shuttle ejecting portion with an opening joining the interior of said stem with that of said sleeve, a pair of chamber end walls extending between said stem and said sleeve disposed on opposite sides of said opening forming a chamber within said sleeve, and an inlet valve connected to said tubular stem adapted to alternatively connect said stem with a pressure source and to vent the same.

23. In a shuttle control for a loom the combination comprising a shuttle receiving box, a shuttle throwing member including a hollow cylindrical sleeve mounted for reciprocable axial movement between a retracted position and a fired position and a shuttle ejecting portion at one end of said sleeve adapted to engage a shuttle within said box and impel the same from the box upon movement of said sleeve toward fired position, a tubular stem extending within said sleeve from the end opposite the shuttle ejecting portion with an opening joining the interior of said stem with that of said sleeve, a pair of chamber end walls extending between said stem and said sleeve disposed on opposite sides of said opening forming a chamber within said sleeve, a firing motor including a cylinder and piston joined to a pressure source with connecting means between said piston and said throwing member adapted to move said throwing member toward fired position, trigger means having a position restraining said piston and movable from said position to permit said piston to move said throwing member, and an inlet valve connected to said tubular stem adapted to alternatively connect said stem with a pressure source and to vent the same.

24. A shuttle control in accordance with claim 22 having movement arresting means for decelerating said throwing member when moving toward fired position including a cylinder joined to a pressure source and a piston engageable with said throwing member to be worked against the pressure of said pressure source by said throwing member.

25. In a shuttle control for a loom the combination comprising a shuttle throwing member having a retracted position and a fired position including a cylinder and piston relatively movable with respect to one another, a firing motor for said throwing member having a cylinder and a piston cooperatively engaged with said throwing member to drive the same in shuttle throwing movement, first inlet connections for the cylinder of said shuttle throwing member and for the cylinder of said motor to one side of the said motor piston, a second inlet for said motor cylinder on the opposite side of said motor piston, valve means for said first inlet connections adapted to alternatively join said first connections to a pressure source or to vent the same, and valve operating means responsive to shuttle throwing member position moving said valve means to vent said connections upon said throwing member being in retracted position and moving said valve means to join said connections to a pressure source upon said throwing member being in fired position.

26. A shuttle control in accordance with claim 25 having a port in said piston of the cylinder of said motor connecting both sides of said piston and a valve biased to open position for said port adapted to be held closed by pressure within said cylinder on the side of said piston of said second inlet upon the opposite side of said piston being vented by said valve means.

27. In a shuttle control for a loom the combination comprising a shuttle throwing member having a retracted position and movable from and toward said position, a shuttle throwing member motor having a cylinder and a piston movable in a firing stroke and in a return stroke cooperatively engaged with said shuttle throwing member moving said throwing member from said retracted position when making said firing stroke, an inlet duct opening into said cylinder to the side of said piston from which said piston advances in making a firing stroke, inlet connections opening into said cylinder on the opposite side of said piston including valve means having alternate positions for joining said cylinder to a pressure source and venting said cylinder, and an operating lever cooperatively engageable with said valve means to operate the same and also cooperatively engageable with said throwing member to be responsive to the positions of the throwing member whereby said valve means is moved to vent position upon said throwing member being disposed in retracted position and is moved to the position joining said cylinder to a pressure source upon said throwing member being moved from its retracted position.

28. In a shuttle control for a loom the combination comprising a shuttle receiving box having an entrance, a set of weft thread clamping jaws disposed to the front of said entrance movable between open and closed position, a cylinder having a piston cooperatively engaged with said set of jaws moving said jaws between open and closed positions upon reciprocation within said cylinder, inlet connections for said cylinder including valve means, and valve operating means.

29. In a shuttle control for a loom the combination comprising a lay having a support for a shuttle box, a shuttle box having an elongated recess for receiving a shuttle, a shuttle box mounting forming a part of said shuttle box adapted to be secured to said support whereby said mounting is adjustable upon said support for a shift of said shuttle box about an axis extending substantially parallel to the lengthwise dimension of said elongated shuttle receiving recess to tilt the shuttle box with respect to the lay, and fastening means securing said mounting to said support for clamping said mounting rigidly in position upon disposing said shuttle box to desired position.

30. In a shuttle control for a loom the combination comprising a lay having a track extending longitudinally thereof, a support for a shuttle box slidable along said track, first fastening means for securing said support to said track upon sliding said support to desired position, a shuttle box having an elongated recess for receiving a shuttle extending substantially parallel to said track, a shuttle box mounting forming a part of said shuttle box adapted to be secured to said support whereby said mounting is adjustable upon said support for a tilting of said shuttle box with respect to the lay and for adjustment of height with respect to said lay, and fastening means securing said mounting to said support for clamping said mounting rigidly in position upon disposing said shuttle box to desired position.

31. In a shuttle control for a loom the combination comprising a lay having a support for a shuttle box, a shuttle box having an elongated recess for receiving and discharging a shuttle, shuttle throwing means carried by said shuttle box, shuttle braking means carried by said shuttle box, and a mounting forming a part of said shuttle box adapted to seat against said support, said support and mounting having curved facing contacting surface areas whereby the surface area of said mounting may be shifted along the surface areas of said support to move said shuttle box about an axis extending substantially parallel to the lengthwise dimension of said elongated shuttle receiving recess.

32. In a shuttle control for a loom the combination comprising a shuttle box, having an entrance for receipt and discharge of a shuttle, a shuttle brake, shuttle homing means having a member movable along said box to move a shuttle therein after braking of the shuttle, weft feeding means including guides adapted to lead a weft to the entrance of said shuttle box and a set of weft tension members adapted to be pressed against one another aligned with said guides to have a weft pass therebetween, and bias means urging said tension members toward one another.

33. In a shuttle control for a loom the combination comprising a lay, a shuttle box adapted to receive a shuttle mounted on said lay, an actuating member on said lay having a normal position and movable therefrom to a firing position and a clamp actuating position, a shuttle throwing member cooperatively engaged with said shuttle box, firing means associated with said shuttle box adapted when actuated to urge said throwing member in shuttle ejecting movement, a weft seizing clamp associated with said shuttle box operable to and from weft seizing position, and connecting means cooperatively engaged with and extending between said actuating member and said firing means and said clamp whereby movement of said actuating member to said firing position actuates said firing means and movement of said actuating member to said clamp actuating position actuates said clamp to weft seizing position.

34. In a shuttle control for a loom the combination comprising a lay having a mounting track extending longitudinally thereof, a shuttle box adapted to receive a shuttle slidably carried on and adjustable in position along said track, an actuating member supported on said lay extending alongside said track having a normal position and movable therefrom to a firing position and a clamp actuating position, a shuttle throwing member for said shuttle box, firing means associated and movable with said shuttle box adapted when actuated to propel said throwing member in shuttle ejecting movement, a weft seizing clamp movable with said shuttle box operable to and from a weft seizing position, and connecting means releasably engaged with said actuating member extending therefrom to cooperative engagement with said firing means and said clamp whereby movement of said actuating member to said firing position actuates said firing means and movement of said actuating member to said clamp actuating position actuates said clamp to weft seizing position.

35. In a shuttle control for a loom the combination comprising a lay, a shuttle box adapted to receive a shuttle mounted on and adjustable in position longitudinally along said lay, an elongated actuating rod extending longitudinally along said lay having a normal position and axially movable to a firing position, a shuttle throwing member for said shuttle box having a retracted position and movable therefrom in shuttle ejecting movement, firing means associated and movable with said shuttle box adapted to propel said throwing member in shuttle ejecting movement, triggering means for said firing means normally positioned to prevent actuation of said throwing member when in said retracted position and movable to a firing position permitting actuation of said throwing member by said firing means, and connecting means joined to said triggering means and extending therefrom to a releasable connection with said actuating member whereby said triggering means is moved to its firing position upon movement of said actuating member to its respective firing position, said connecting means being releasable from connection with said actuating member permitting shift of position of said shuttle box along said lay.

36. In a shuttle control for a loom the combination comprising a lay, a shuttle box adapted to receive a shuttle mounted on and adjustable in position longitudinally along said lay, an elongated actuating member extending longitudinally along said lay having a normal position and movable therefrom to a firing position and a weft clamp actuating position, a shuttle throwing member for said shuttle box having a retracted position and movable therefrom in a shuttle throwing movement, firing means associated and movable with said shuttle box adapted to propel said throwing member in shuttle ejecting movement, triggering means for said firing means, a weft seizing clamp movable with said shuttle box operable to and from weft seizing position, operating means for said weft seizing clamp to cause said clamp to move to weft seizing position, and connecting means cooperatively engaged with and extending between said actuating member and said triggering means and said clamp operating means whereby movement of said actuating member to said firing position actuates said triggering means to permit said firing means to cause ejecting movement of said shuttle throwing member and movement of said actuating member to said clamp actuating position actuates said weft clamp operating means to cause said weft clamp to move to weft seizing position.

37. In a shuttle control for a loom the combination comprising a lay, a shuttle box adapted to receive a shuttle mounted on and adjustable in position longitudinally along said lay, an elongated actuating member extending longitudinally along said lay having a normal position and movable therefrom to a firing position and a weft clamp actuating position, a shuttle throwing member for said shuttle box having a retracted position and movable therefrom in a shuttle throwing movement, firing means associated and movable with said shuttle box adapted to propel said throwing member in shuttle ejecting movement, a releasable latch cooperatively engageable with said throwing member when in said retracted position to restrain movement thereof, a weft seizing clamp movable with said shuttle box operable to and from weft seizing position, operating means for said weft seizing clamp to cause said clamp to move to weft seizing position, and connecting means cooperatively engaged with and extending between said actuating member and said releasable latch and said clamp operating means whereby said latch is released upon movement of said actuating member to said firing position and said clamp operating means is actuated to move said weft clamp to weft seizing position upon movement of said actuating member to said weft clamp actuating position.

38. In a shuttle control for a loom the combination comprising a lay; a shuttle box member having a recess for receiving a shuttle attached to and movable along said lay; shuttle throwing means carried by said shuttle box member; actuating means for said shuttle throwing means including an electro-magnetic actuator secured to said shuttle box member; weft engaging means mounted upon said member to the front of said shuttle receiving recess; and actuating means for said weft engaging means including a second electro-magnetic actuator secured to said shuttle box member.

39. In a shuttle control for a loom the combination comprising a lay; a track extending along said lay; a mounting member slidably engaged with and movable along said track; a shuttle box member having an elongated recess for receiving a shuttle secured to said mounting member and tiltable with respect thereto; shuttle throwing means carried by said shuttle box member; actuating means for said shuttle throwing means including an electro-magnetic actuator secured to said shuttle box member; weft engaging means mounted upon said shuttle box member to the front of said shuttle receiving recess; and actuating means for said weft engaging means including a second electro-magnetic actuator secured to said shuttle box member.

40. In a shuttle control for a loom the combination comprising a lay; a shuttle box member having a recess for receiving a shuttle attached to and movable along said lay; shuttle throwing means carried by said shuttle box member; actuating means for said shuttle throwing means secured to said shuttle box member including a cylinder with an actuating piston, a valve joined to said cylinder, and an electro-magnet in operating relation to said valve; weft engaging means mounted upon said shuttle box member to the front of said shuttle receiving recess and actuating means for said weft engaging means secured to said shuttle box member including a second cylinder with an actuating piston, a second valve joined to said cylinder, and a second electro-magnet in operating relation to said second valve.

41. In a shuttle control for a loom the combination comprising a shuttle box; a shuttle brake having a first brake member and a second brake member rotatable with respect to said first brake member for frictional engagement therewith, said first and second brake members being relatively displaceable for disengagement; a shuttle engaging element disposed to be engaged by and carried with a shuttle entering the shuttle box; flexible connecting means joined at one end to said shuttle engaging element and at the other end to said second brake member, which means is wound about the second brake member whereby movement of said shuttle engaging member with a shuttle withdraws the connecting means to cause rotation of said second brake member and thereby impart frictional drag to a shuttle; a brake release means responsive to shuttle position adapted to cause disengagement of said brake members after braking a shuttle; and brake return means adapted to rotate said second brake member in a direction opposite to that occurring during braking of a shuttle.

References Cited in the file of this patent

UNITED STATES PATENTS

| | | |
|---|---|---|
| 758,895 | Brink et al. | May 3, 1904 |
| 841,863 | Harris | Jan. 22, 1907 |
| 1,513,044 | Jones et al. | Oct. 28, 1924 |
| 1,826,484 | Schultz | Oct. 6, 1931 |
| 2,030,270 | Rossmann | Feb. 11, 1936 |
| 2,501,394 | La Freniere | Mar. 21, 1950 |
| 2,537,895 | Hicks | Jan. 9, 1951 |
| 2,649,118 | Heath | Aug. 18, 1953 |